United States Patent
Sugimoto et al.

(10) Patent No.: US 12,406,814 B2
(45) Date of Patent: Sep. 2, 2025

(54) SOLID ELECTROLYTIC CAPACITOR ELEMENT, SOLID ELECTROLYTIC CAPACITOR AND METHOD FOR PRODUCING SAME

(71) Applicant: Panasonic Intellectual Property Management Co., Ltd., Osaka (JP)

(72) Inventors: Tomoki Sugimoto, Kyoto (JP); Kei Hirota, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 223 days.

(21) Appl. No.: 18/001,672

(22) PCT Filed: Jul. 2, 2021

(86) PCT No.: PCT/JP2021/025152
§ 371 (c)(1),
(2) Date: Dec. 13, 2022

(87) PCT Pub. No.: WO2022/009799
PCT Pub. Date: Jan. 13, 2022

(65) Prior Publication Data
US 2023/0268136 A1    Aug. 24, 2023

(30) Foreign Application Priority Data
Jul. 7, 2020  (JP) .................................. 2020-117401

(51) Int. Cl.
*H01G 9/048*  (2006.01)
*H01G 9/00*  (2006.01)
*H01G 9/15*  (2006.01)

(52) U.S. Cl.
CPC ........... *H01G 9/048* (2013.01); *H01G 9/0032* (2013.01); *H01G 9/0036* (2013.01); *H01G 9/15* (2013.01)

(58) Field of Classification Search
CPC .... H01G 9/048; H01G 9/0032; H01G 9/0036; H01G 9/15; H01G 9/012; H01G 9/028;
(Continued)

(56) References Cited

U.S. PATENT DOCUMENTS 6,320,742 B1 *  11/2001  Wada ..................... H01G 11/56
                                                       29/25.03
2003/0007311 A1 *  1/2003  Kojima .................. H01G 9/012
                                                       29/25.03
(Continued)

FOREIGN PATENT DOCUMENTS

JP          59-161808         9/1984
JP          2005-216929       8/2005
(Continued)

OTHER PUBLICATIONS

International Search Report of PCT application No. PCT/JP2021/025152 dated Sep. 21, 2021.

*Primary Examiner* — Timothy J. Dole
*Assistant Examiner* — Daniel M Dubuisson
(74) *Attorney, Agent, or Firm* — Rimon P.C.

(57) ABSTRACT

A solid electrolytic capacitor element includes an anode foil that includes a porous part in a surface layer of the anode foil, a dielectric layer, and a cathode part. The cathode part includes a solid electrolyte layer that covers the at least a part of the dielectric layer and a cathode lead-out layer that covers at least a part of the solid electrolyte layer. The anode foil includes a first part that is a cathode forming part where the solid electrolyte layer is formed and a second part where the solid electrolyte layer is not formed. And the anode foil includes a dense part in the surface layer in at least one of (Continued)

the first part and the second part. The dense part has a porosity smaller than a porosity of the porous part. The second part includes at least an anode part including an end part of the anode foil opposite to the first part.

24 Claims, 11 Drawing Sheets

(58) Field of Classification Search
CPC .......... H01G 9/04; H01G 9/052; H01G 9/055; H01G 9/07
See application file for complete search history.

(56) References Cited

U.S. PATENT DOCUMENTS

| | | | |
|---|---|---|---|
| 2005/0162814 A1 | 7/2005 | Maruko et al. | |
| 2006/0256506 A1* | 11/2006 | Konuma | H01G 9/14 361/540 |
| 2007/0247781 A1* | 10/2007 | Baba | H01G 9/012 361/272 |
| 2008/0232027 A1 | 9/2008 | Ozawa et al. | |
| 2009/0080144 A1* | 3/2009 | Matumoto | H01G 11/48 29/25.03 |
| 2010/0039751 A1 | 2/2010 | Oohata et al. | |
| 2013/0321986 A1* | 12/2013 | Djebara | B23K 26/323 29/25.03 |
| 2018/0047517 A1* | 2/2018 | Kanryo | H01G 9/012 |
| 2018/0233294 A1* | 8/2018 | Ishizaki | H01G 9/048 |
| 2019/0006109 A1* | 1/2019 | Shimamoto | H01G 9/025 |
| 2019/0206629 A1* | 7/2019 | Haas | B22F 10/28 |
| 2019/0244765 A1* | 8/2019 | Harada | H01G 9/045 |
| 2020/0402723 A1* | 12/2020 | Furukawa | H01G 9/012 |

FOREIGN PATENT DOCUMENTS

| | | | |
|---|---|---|---|
| JP | 2008186841 A | * | 8/2008 |
| JP | 2008-235410 | | 10/2008 |
| JP | 2009129936 A | * | 6/2009 |
| JP | 4900851 B2 | * | 3/2012 |
| WO | 2006/137482 | | 12/2006 |
| WO | 2010/131289 | | 11/2010 |

* cited by examiner

SOLID ELECTROLYTIC CAPACITOR ELEMENT, SOLID ELECTROLYTIC CAPACITOR AND METHOD FOR PRODUCING SAME

CROSS-REFERENCE TO RELATED APPLICATIONS

This application is a U.S. national stage application of the PCT International Application No. PCT/JP2021/025152 filed on Jul. 2, 2021, which claims the benefit of foreign priority of Japanese patent application No. 2020-117401 filed on Jul. 7, 2020, the contents all of which are incorporated herein by reference.

TECHNICAL FIELD

The present disclosure relates to a solid electrolytic capacitor element, a solid electrolytic capacitor including a solid electrolytic capacitor element, and a method for producing a solid electrolytic capacitor.

BACKGROUND

A solid electrolytic capacitor includes a capacitor element including a solid electrolyte layer, an electrode terminal electrically connected to the capacitor element, and an exterior body sealing the capacitor element. The capacitor element includes, for example, an anode foil including a porous part in a surface layer of the anode foil, a dielectric layer formed on at least a part of a surface of the anode foil, a solid electrolyte layer covering at least a part of the dielectric layer, and a cathode lead-out layer covering at least a part of the solid electrolyte layer.

Unexamined Japanese Patent Publication No. 2005-216929 discloses a surface-mounted thin-type capacitor using, as base materials, a metal foil including a metal core wire and an etched layer covering both surfaces of the metal core wire. In the surface-mounted thin-type capacitor, both end parts of the metal foil are used as anodes, and a cathode is formed on a surface of a central part of the metal foil. The surface-mounted thin-type capacitor includes a resist resin formed at a boundary between the anode and the cathode, and a conductive polymer layer formed by polymerization of a conductive polymer inside and on a surface of the etched layer at the central part of the metal foil. In the surface-mounted thin-type capacitor in which the cathode is formed on a surface of the conductive polymer layer, and the resist resin is formed to block the etched layer on the anode side and the conductive polymer layer.

SUMMARY

A solid electrolytic capacitor element according to a first aspect of the present disclosure includes an anode foil that includes a porous part in a surface layer of the anode foil, a dielectric layer that is disposed on at least a part of a surface of the anode foil, and a cathode part that covers at least a part of the dielectric layer. The cathode part includes a solid electrolyte layer that covers the at least a part of the dielectric layer and a cathode lead-out layer that covers at least a part of the solid electrolyte layer. The anode foil includes a first part that is a cathode forming part where the solid electrolyte layer is formed and a second part where the solid electrolyte layer is not formed. And the anode foil includes a dense part in the surface layer in at least one of the first part and the second part. The dense part has a porosity smaller than a porosity of the porous part. The second part includes at least an anode part including an end part of the anode foil opposite to the first part.

A solid electrolytic capacitor according to another aspect of the present disclosure includes at least one solid electrolytic capacitor element.

A method for producing a solid electrolytic capacitor element according to still another aspect of the present disclosure includes (i) forming an anode foil that includes a porous part and a dense part having a porosity smaller than a porosity of the porous part by roughening a surface of a metal foil, after disposing a mask on a part of a surface of a metal foil containing a valve metal, to form the porous part in a surface layer of the metal foil and to form the dense part in a region protected by the mask in the surface layer of the metal foil, the anode foil including a first part that is a cathode forming part and a second part including at least an anode part including an end part opposite to the first part, (ii) forming a dielectric layer on at least a part of a surface of the anode foil, (iii) covering at least a part of the dielectric layer in the first part with a solid electrolyte layer, and (iv) covering at least a part of the solid electrolyte layer with a cathode lead-out layer to form a cathode part including the solid electrolyte layer and the cathode lead-out layer.

A method for producing a solid electrolytic capacitor element to still another aspect of the present disclosure includes (i) forming an anode foil that includes a porous part by roughening a surface of a metal foil containing a valve metal to form the porous part in a surface layer of the metal foil, the anode foil including a first part that is a cathode forming part and a second part including at least an anode part including an end part opposite to the first part, (ii) forming a dielectric layer on at least a part of a surface of the anode foil, (iii) forming a dense part by melting a part of the surface layer of the anode foil, (iv) covering at least a part of the dielectric layer in the first part with a solid electrolyte layer, and covering at least a part of the solid electrolyte layer with a cathode lead-out layer to form a cathode part including the solid electrolyte layer and the cathode lead-out layer.

According to the present disclosure, it is possible to suppress a decrease in electrostatic capacity in a case where the solid electrolytic capacitor is exposed to a high temperature.

DESCRIPTION OF EMBODIMENT

Figure 1:
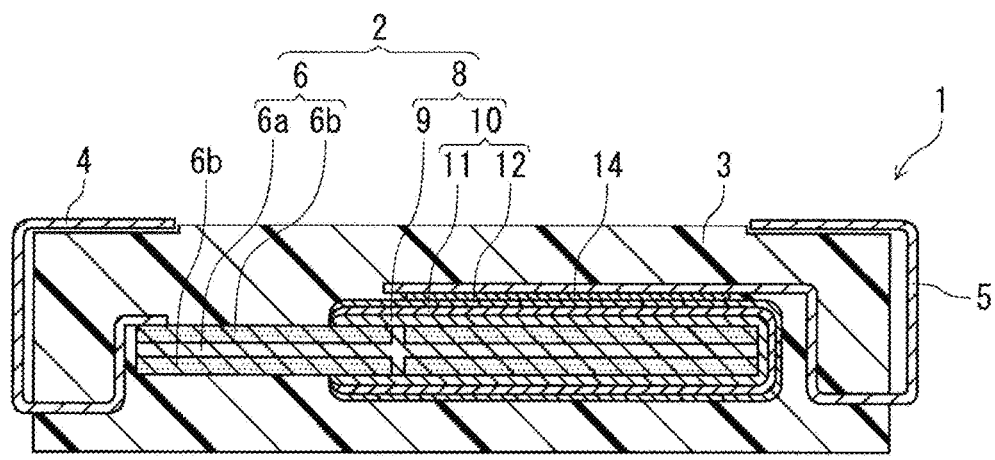
FIG. 1 is a cross-sectional view schematically illustrating a solid electrolytic capacitor according to a first exemplary embodiment of the present disclosure.

An anode foil of a solid electrolytic capacitor element has a porous part provided in a surface layer of the anode foil. The porous part includes many voids. An anode part of the anode foil on which a solid electrolyte layer is not formed is connected to an electrode terminal. Thus, air may enter an inside of the capacitor element from the electrode terminal side through the void in the porous part of the anode foil.

Prior to the description of an exemplary embodiment, a problem in the prior art will be briefly described below. When the air enters an inside of a solid electrolytic capacitor, a conductive polymer contained in the solid electrolyte layer is oxidized and deteriorated or dopant is decomposed by an action of moisture or oxygen contained in the air, and thus, the solid electrolyte layer may be deteriorated and conductivity may be lowered. The deterioration of the solid electrolyte layer leads to a decrease in performance of the solid electrolytic capacitor, such as a decrease in electrostatic capacity of the solid electrolytic capacitor or an increase in equivalent series resistance (ESR). Such deterioration of the solid electrolyte layer is remarkable particularly in a high-temperature environment.

The solid electrolytic capacitor may be used in the high-temperature environment depending on the application. In addition, the solid electrolytic capacitor is generally soldered to a substrate through a reflow step exposed to a high temperature. Thus, there is a demand for the solid electrolytic capacitor element and the solid electrolytic capacitor that suppress the deterioration in the solid electrolyte layer under the high-temperature environment and have excellent thermal stability.

In view of the above circumstance, a solid electrolytic capacitor element according to an aspect of the present disclosure includes an anode foil that includes a porous part in a surface layer of the anode foil, and includes a dense part having a porosity lower than a porosity of the porous part in the surface layer in at least one of a first part or a second part. The first part is a cathode forming part where a solid electrolyte layer is formed, and the second part is a part where the solid electrolyte layer is not formed. The second part includes at least an anode part including an end part of the anode foil opposite to the first part. In such an anode foil, the dense part has air permeability lower than air permeability of the porous part. Thus, entry of air to an inside of the solid electrolytic capacitor element from the anode part side is reduced by providing the dense part in the surface layer of the anode foil. Since the entry of air is reduced, an effect of reducing deterioration of the solid electrolyte layer is enhanced even after a solid electrolytic capacitor is exposed to a high temperature. Hence, it is possible to suppress a decrease in electrostatic capacity after the solid electrolytic capacitor is exposed to the high temperature. Accordingly, reliability of the solid electrolytic capacitor element can be improved. Further, since the deterioration of the solid electrolyte layer is reduced, an increase in ESR and dielectric dissipation factor (tan δ) in a case where the solid electrolytic capacitor is exposed to the high temperature can be suppressed to a low level.

Note that the anode foil includes a base material part and porous parts of surface layers. The porous parts are respectively positioned on both main surfaces of the base material part.

In the present specification, the dense part is defined as follows. In an image of a scanning electron microscope (SEM) of a cross section when the solid electrolytic capacitor element is cut in a direction parallel to a longitudinal direction thereof and parallel to a thickness direction of the anode foil, the dense part is a region in which a ratio of a part showing a color difference in a specific range is higher than a predetermined value in the surface layer of the anode foil. More specifically, in the SEM image of the cross section with respect to the surface layer of the anode foil, the dense part is a region in which an area ratio (%) of the part showing the color difference in the specific range, which corresponds to a part including constituent components (specifically, a valve metal) of the anode foil, in a region having a predetermined area (for example, 1 μm in length×1 μm in width) is greater than or equal to 50%. The specific range of the color difference means a range from 0.8 $C_d$ to 1.2 $C_d$, inclusive, where Ca is a color difference when a distribution of color differences becomes a peak in the base material part of the anode foil. In the SEM image of the cross section, color difference Ca is a color difference when a cross section of the anode foil is distinguished by two colors (specifically, white and black) based on luminance, and when the color difference is expressed in 255 stages, the distribution of color differences becomes a peak in the base material part of the anode foil. It means that the porosity decreases as the ratio of the part showing the color difference in the specific range increases. Note that it can be said that the porosity corresponds to an area ratio (%) of a part (specifically, a part occupied by a void, a conductive polymer, an insulating material, and the like in the surface layer) other than the part showing the color difference in the specific range in the SEM image of the cross section.

The porous part is generally formed by performing a roughening treatment (for example, etching treatment) on a metal foil containing a valve metal constituting the anode foil. In the porous part, for the region having the predetermined area (1 μm in length×1 μm in width), a ratio of a part showing a specific color difference obtained in the same manner as described above is less than 50%. Examples of the dense part include at least one of a non-roughened part (for example, a non-etched part) protected from the roughening treatment (etching treatment or the like) by using a mask or the like, and a molten part formed by melting the porous part. In the anode foil, a compressed part may be formed by compressing the porous part formed by the roughening treatment, but such a compressed part is distinguished from the dense part. In other words, it can also be said that the dense part is an uncompressed part.

Hereinafter, a solid electrolytic capacitor and a solid electrolytic capacitor element (hereinafter, may be simply referred to as a capacitor element) of the present disclosure, and a method for producing a solid electrolytic capacitor will be described more specifically with reference to the drawings as necessary.

[Solid Electrolytic Capacitor]

A solid electrolytic capacitor includes one or two or more capacitor elements. In at least one of the capacitor elements included in the solid electrolytic capacitor, the anode foil may have the dense part described above. In 50% or more of the number of capacitor elements included in the solid electrolytic capacitor, the anode foil preferably has the dense part, the anode foil more preferably has the dense part in 75% or more, and the anode foil still more preferably has the dense part in all the capacitor elements.

From the viewpoint of more effectively reducing the entry of air from the anode part side, the anode foil preferably includes the dense part in a region closer to the second part than a center of the first part in the longitudinal direction is. In other words, the dense part is preferably provided in at least one region selected from the second part or a half region of the first part at a side close to the second part in the longitudinal direction. The dense part may be provided at one position, or may be provided at two or more positions. Further, the dense part is formed in a surface layer of at least one of a pair of main surfaces (in other words, a surface except for an end face), which occupy most of a surface of the anode foil.

The anode foil includes an end part (may be referred to as a second end part) positioned at a side connected to an anode terminal, and an end part (may be referred to as a first end part) positioned in the first part (that is, a cathode forming part) at a side opposite to the second end part. The anode part includes the end part (that is, the second end part) opposite to the first end part. The longitudinal direction of the first part is a direction along a straight line connecting a center of an end face of the first end part and a center of an end face of the second end part of the anode foil, and is used in the same meaning as the longitudinal direction of the anode foil.

A percentage of total of a projected area of the dense part to an effective area of a cathode part is preferably greater than or equal to 0.002%, and may be greater than or equal to 0.01% or greater than or equal to 0.1%. Here, the projected area is an area projected to the anode foil in a thickness direction of the anode foil. In a case where the percentage of total of the projected area of the dense part is in such a range, it is advantageous because the entry of air to the inside of the capacitor element can be further reduced. The percentage of the total of the projected area of the dense part may be less than or equal to 20%. From the viewpoint of securing a higher capacitance, a percentage of total of a projected area of a first dense part is preferably less than or equal to 10%, and may be less than or equal to 5% or less than or equal to 1%. These lower and upper limit values can be arbitrarily combined.

The effective area of the cathode part means an area calculated by obtaining a projected area when the solid electrolyte layer is orthographic projected to one of a pair of main surfaces of the anode foil at a side close to the solid electrolyte layer, and adding the projected areas of the solid electrolyte layer for both of the pair of main surfaces of the anode foil. Similarly, total of projected areas of the dense part means an area calculated by obtaining a projected area when the dense part is orthographic projected to one of the pair of main surfaces of the anode foil at a side close to the dense part, and adding the projected areas of the dense part for both of the pair of main surfaces of the anode foil. When two or more dense parts are present for the one of the pair of main surfaces of the anode foil, the projected area of the dense part is total of the projected areas of all the dense parts.

The effective area of the cathode part is obtained for the capacitor element in a state where the solid electrolytic capacitor is disassembled, the capacitor element is taken out, the surface layer of the capacitor element is scraped off as necessary, and the solid electrolyte layer is exposed. The effective area is obtained by capturing a digital image in a perpendicular direction for each surface of the pair of main surfaces of the anode foil of the capacitor element, distinguishing the cathode part and the other part by binarization treatment, calculating an area of the part of the cathode part, and adding the areas for the surfaces.

The dense part may be provided in at least one of the first part or the second part. The anode foil may include at least one dense part in a region (more specifically, a boundary between the first part and the second part as well as a part near the boundary) from a vicinity of an end of the first part at a side close to the second part to a vicinity of an end of the second part at a side close to the first part. Note that, in the second part, a separation part may be provided between the anode part and the cathode forming part that is the first part. The dense part may be provided in the separation part. Further, at least one dense part may be provided in a region (more specifically, a boundary between the first part and the separation part as well as a part near the boundary) from the vicinity of the end of the first part at a side close to the second part to a vicinity of an end of the separation part at a side close to the first part.

In the present specification, the dense part positioned in the first part and the dense part positioned in the anode part of the second part may be referred to as a first dense part and a second dense part, respectively, for the sake of convenience. The dense part positioned in the separation part may be referred to as a third dense part for the sake of convenience. When focusing on one dense part, in a case where this dense part is provided at the boundary between the first part and the second part (or the separation part) and the part near the boundary, this dense part may be referred to as the first dense part for the sake of convenience. The anode foil may have at least one selected from the group consisting of the first dense part, the second dense part, and the third dense part. Each of the first dense part, the second dense part, and the third dense part may be provided at one position or at two or more positions.

The size and the number of the dense part are adjusted such that the percentage of the total of the projected area of the dense part in the thickness direction of the anode foil falls within the above-mentioned range.

For example, the dense part may be provided to cross a direction parallel to the longitudinal direction of the anode foil (for example, in a width direction of the anode foil,) when the surface of the anode foil is viewed from the perpendicular direction. In this case, the entry of air from the anode part can be more easily reduced. For example, a plurality of dense parts may be provided at intervals along the width direction of the anode foil, or a continuous dense part may be provided to cross the entire width direction.

The anode foil may include a groove adjacent to the dense part. The dense part may be provided in either a region at the first part side (or the first end side) adjacent to the groove or a region at the second part side (or the second end side) adjacent to the groove, or may be provided in both the regions. In addition, the dense part may also be provided at a bottom of the groove. The dense part provided at the bottom may be integrated with the base material part or may be distinguishable from the base material part. The anode foil may include a groove positioned at and near the boundary between the first part and the second part. Such a groove may be adjacent to at least one of the first dense part and the second dense part, or may be adjacent to at least one of the first dense part and the third dense part. In a part where the groove is formed, since the number of passages for air is smaller than the number of passages for air in the porous part, in a case where the anode foil has such a groove, the entry of air to the inside of the capacitor element can be further reduced. In the present specification, the groove positioned in the first part may be referred to as a first groove, the groove positioned in the anode part may be referred to as a second groove, and the groove positioned in the separation part may be referred to as a third groove. Further, the groove positioned at and near the boundary between the first part and the second part may be referred to as a first groove for the sake of convenience. A groove positioned at and near a boundary between the anode part and the separation part may be referred to as a second groove for the sake of convenience.

The groove may be provided over the entire thickness of the surface layer (that is, the porous part) of the anode foil, may be provided on a part of the surface side of the surface layer, or may be provided in a state of biting into the base material part. In a case where the groove is provided on a part of the surface side of the surface layer, the porous part may be present between the groove and the base material part, but the thickness of the porous part between the groove and the base material part is preferably small from the viewpoint of further reducing the entry of air to the inside of the capacitor element. For example, when a thickness of the porous part is T, a depth of the groove is preferably greater than or equal to 0.95 T, and may be greater than or equal to 0.98 T. The depth of the groove is, for example, less than or equal to 1.5 T, and may be less than or equal to 1.2 T. These lower and upper limit values can be arbitrarily combined. From the viewpoint of further enhancing an effect of suppressing the entry of air, it is preferable that the porous part is not present between the groove and the base material part. Note that thickness T of the porous part is an average value of thicknesses of the porous parts measured at a plurality of points (for example, five points) in a region where the dense part and the groove of the first part are not formed. The depth of the groove is a maximum depth of the groove obtained in the SEM image of the cross section of the capacitor element crossing the groove.

For one groove, the width of the groove may be, for example, in a range from 1 μm to 3 mm, inclusive, in a range from 1 μm to 1.5 mm, inclusive, in a range from 1 μm to 100 μm, inclusive, in a range from 1 μm to 50 μm, inclusive, or in a range from 1 μm to 30 μm, inclusive. In a case where the width of the groove is in such a range, the entry of air from the anode part side can be further reduced, and a certain degree of strength can be easily secured. Note that the width of the groove is the width of the opening of the groove measured in the SEM image of the cross section of the capacitor element crossing the groove. For example, the width of the groove can be measured by using an image of a cross section parallel to the longitudinal direction of the anode body and perpendicular to the width direction.

The shape of the groove is not particularly limited. The groove may have a slit shape or a hollow. A cross-sectional shape of the groove is not particularly limited, and may be a V-shape, a U-shape, or the like.

In the anode foil, an insulating material (hereinafter, may be referred to as a first insulating material.) may cover at least a part of a region of the groove. In this case, even though air enters from the anode part side, since air is less likely to pass by the first insulating material, the entry of air to the inside of the capacitor element is further reduced. Further, since the groove is reinforced by the first insulating material, stress applied to the groove can be alleviated. The first insulating material may cover at least a part of the region of the groove, the first insulating material may be disposed on at least a part of an inner surface of the groove, and the groove may be at least partially filled with the first insulating material. Further, in a case where the porous part is present around the groove, the first insulating material may be contained (for example, impregnated) in the porous part around the groove.

In the first groove, the solid electrolyte layer may be disposed in at least a part of the region. Further, in the second groove or the third groove positioned near the first part, the solid electrolyte layer may be disposed in at least a part of the region. In these cases, even though air enters from the anode part side, since air is less likely to pass by the solid electrolyte layer, the entry of air to the inside of the capacitor element is further reduced. Further, since the groove is reinforced by the solid electrolyte layer, stress applied to the groove can be alleviated. The solid electrolyte layer may cover at least a part of the region of the groove, the solid electrolyte layer may be disposed on at least a part of the inner surface of the groove, and the solid electrolyte layer may be at least partially filled (or may enter) into the groove. For example, when the solid electrolyte layer of the capacitor element is formed, the constituent components of the solid electrolyte layer enter the groove, and thus, the solid electrolyte layer is disposed in the groove.

In each groove of the first groove and the third groove positioned near the first part, the first insulating material may cover at least a part of the region of the groove, and the solid electrolyte layer may be disposed in at least a part of the region of the groove. For example, when the solid electrolyte layer of the capacitor element is formed after at least a part of the region of the groove is covered with the first insulating material, the solid electrolyte layer enters the groove, and thus, the solid electrolyte layer is disposed in the groove.

In a case where the anode foil includes the separation part between the anode part and the first part, the capacitor element usually includes an insulating material (hereinafter, may be referred to as a second insulating material.) in at least a part of the separation part. The capacitor element includes the second insulating material in the separation part, and thus, it is easy to ensure insulation between the anode part and the cathode part. The second insulating material may be disposed on the surface of the separation part, may be contained in the porous part of the separation part, or may be both of the separation part and the porous part. In a case where the second insulating material is disposed on the surface of the separation part, the second insulating material suppresses the conductive polymer from creeping up to the second part side in a case where the solid electrolyte layer is formed, and regulates contact between the anode part and the cathode part.

Note that the separation part is a region between an end of the second insulating material on the second end side and an end of the first part on the second end side in the anode foil.

The separation part may include a recess (however, except for the third groove) having a thickness smaller than a thickness of the anode foil of the first part. The recess is formed by compressing the porous part or partially removing the porous part. Since the part of the recess has fewer passages for air than the porous part, it is possible to further reduce the entry of air from the anode part side by providing the recess. In the recess formed by compression, a compressed porous part (also referred to as a compressed part) is present between the recess and the base material part. The porous part may be present between the recess and the base material part in the recess formed by removal, but it is preferable that the porous part is not present such that air is less likely to pass.

Note that the recess is a part of the separation part except for the third groove present adjacent to the third dense part, and is a part where the thickness of the anode foil is smaller than the thickness of the anode foil of the first part. The thickness of the anode foil of the first part is an average value of thicknesses of the anode foil measured at a plurality of points (for example, five points) in a region where the dense part and the groove of the first part are not formed.

The second insulating material may be disposed on the surface of the recess. The second insulating material is disposed in the recess, and thus, the entry of air can be further reduced. Further, the insulation between the anode part and the cathode part can be more easily ensured, and stress applied to the recess can be alleviated by the second insulating material.

In the separation part, the third dense part may be provided between the second insulating material and the first part, may be provided in a region covered with the second insulating material disposed on the surface, or may be provided in both the regions. In a case where the third dense part is provided in the region covered with the second insulating material, the compressed part or the porous part is presents between the second insulating material and the base material part, and the third dense part is formed in a part of the compressed part or the porous part. Even in a case where the third dense part is provided at any of these positions, the third groove adjacent to the third dense part may be formed as described above.

The cathode part of the capacitor element has the plurality of layers, and thus, the cathode part has a certain thickness. Accordingly, a stepped part or a recess (hereinafter, may be referred to as a neck) is formed between the part of the second part on the cathode part (or the first part) side and the cathode part. Thus, at least a part of a region extending from a part of the second part on the cathode part (or the first part) side to a part of the cathode part on the second part side may be covered with an insulating material (hereinafter, may be referred to as a third insulating material.). In a case where the anode foil has the separation part, at least a part of the region extending from the part of the separation part on the cathode part (or first part) side to the part of the cathode part on the second part side may be covered with the third insulating material. Since at least a part of the neck is covered with the third insulating material, the entry of air from the neck to the inside of the capacitor element can be reduced. In addition, stress applied to the neck can be alleviated. In addition, for example, at the end of the cathode part on the second part side, there is a part where the solid electrolyte layer is not covered with the cathode lead-out layer. In such a case, the third insulating material may cover at least a part of a surface of the solid electrolyte layer that is not covered with the cathode lead-out layer.

Note that the third insulating material may cover the part other than the neck (for example, the surface (for example, the entire surface of the cathode part) of the cathode part other than the neck) in addition to the neck part. In the neck part and the cathode part, the cathode lead-out layer, the solid electrolyte layer, the first part of the anode foil, and the like may be impregnated with the part of the third insulating material.

Hereinafter, a specific exemplary embodiment will be described with reference to the drawings, but a solid electrolytic capacitor element and a solid electrolytic capacitor of the present disclosure are not limited to the exemplary embodiment.

Figure 2:
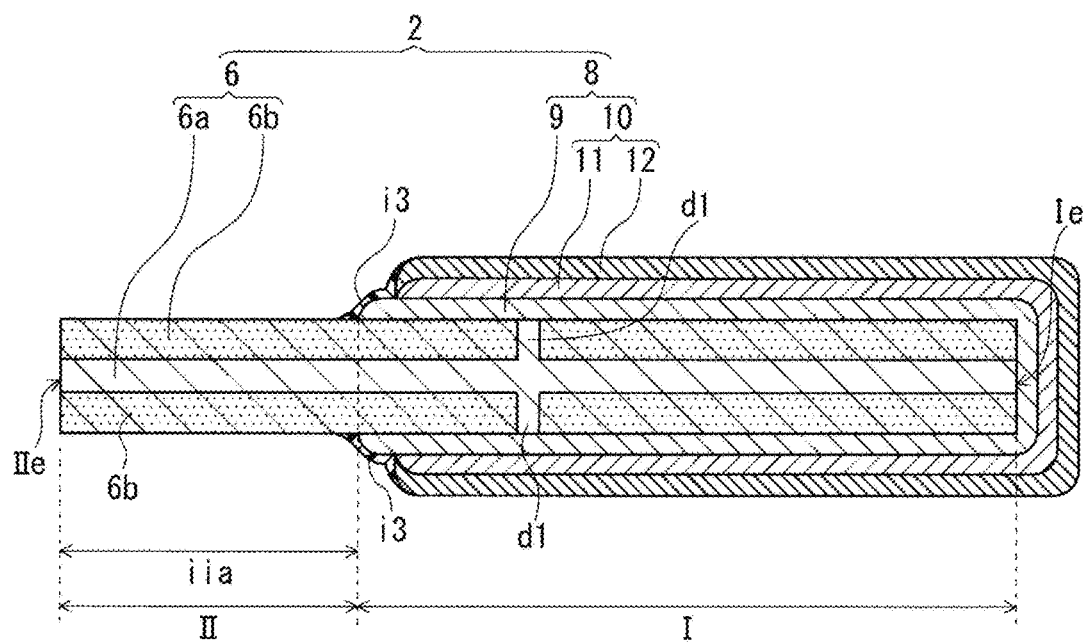
FIG. 2 is a cross-sectional view schematically illustrating a solid electrolytic capacitor element included in the solid electrolytic capacitor of FIG. 1.

FIG. 1 is a cross-sectional view schematically illustrating a structure of a solid electrolytic capacitor according to a first exemplary embodiment of the present disclosure. FIG. 2 is an enlarged cross-sectional view schematically illustrating capacitor element 2 included in the solid electrolytic capacitor of FIG. 1.

Solid electrolytic capacitor 1 includes capacitor element 2, exterior body 3 that seals capacitor element 2, and anode lead terminal 4 and cathode lead terminal 5 that are each at least partially exposed to the outside of exterior body 3. Exterior body 3 has a substantially rectangular parallelepiped outer shape, and solid electrolytic capacitor 1 also has a substantially rectangular parallelepiped outer shape.

Capacitor element 2 includes anode foil 6, a dielectric layer (not shown) covering a surface of anode foil 6, and cathode part 8 covering the dielectric layer. The dielectric layer may be formed on at least a part of the surface of anode foil 6.

Cathode part 8 includes solid electrolyte layer 9 and cathode lead-out layer 10. Solid electrolyte layer 9 is formed so as to cover at least a part of the dielectric layer. Cathode lead-out layer 10 is formed so as to cover at least a part of solid electrolyte layer 9. Cathode lead-out layer 10 incudes first layer 11 that is a carbon layer and second layer 12 that is a metal paste layer. Cathode lead terminal 5 is electrically connected to cathode part 8 with adhesive layer 14 made of a conductive adhesive interposed therebetween.

Anode foil 6 includes base material part 6*a* and porous part 6*b* formed on a surface of base material part 6*a*. Anode foil 6 includes first part I that is a cathode forming part where solid electrolyte layer 9 (or cathode part 8) is formed, and second part II other than first part I. Second part II includes at least anode part iia. Anode lead terminal 4 is electrically connected to anode part iia of anode foil 6 by welding. Anode foil 6 includes second end Ile on a side connected to anode lead terminal 4 and first end Ie opposite to second end Ile.

Anode foil 6 includes first dense part d1 positioned in first part I. In the shown example, first dense part d1 is provided in the entire thickness direction of anode foil 6 in a state of being integrated with base material part 6*a*. In the shown example, first dense part d1 is a non-roughened part or a molten part formed by melting porous part 6*b*. The anode foil includes first dense part d1, and thus, the entry of air from anode part iia side to an inside of capacitor element 2 can be reduced.

Since cathode part 8 of capacitor element 2 has a certain thickness, a stepped part (neck) is formed near a boundary between cathode part 8 (or first part I) and second part II. Thus, at least a part of a region extending from a part of second part II on cathode part 8 side to a part of cathode part 8 on second part II side may be covered with third insulating material i3. Accordingly, since at least a part of the stepped part (neck) is covered with third insulating material i3, it is possible to reduce the entry of air from this part and to alleviate stress applied to the neck.

Exterior body 3 covers a part of capacitor element 2 and lead terminals 4 and 5. From the viewpoint of suppressing the entry of air to the inside of exterior body 3, it is desirable that a part of capacitor element 2 and lead terminals 4 and 5 is sealed with exterior body 3. Although FIG. 1 shows the case where exterior body 3 is a resin exterior body, the present disclosure is not limited to this case, and exterior body 3 may be a case or the like capable of housing capacitor element 2. The resin exterior body is formed by sealing a part of capacitor element 2 and lead terminals 4 and 5 with a resin material.

One ends of lead terminals 4 and 5 are electrically connected to capacitor element 2, and the other ends are led out of exterior body 3. In solid electrolytic capacitor 1, one end sides of lead terminals 4 and 5 are covered with exterior body 3 together with capacitor element 2.

FIGS. 3 to 6 are cross-sectional views schematically illustrating capacitor element 2 included in a solid electrolytic capacitor according to second to fifth exemplary embodiments. FIG. 2 and FIGS. 3 to 6 show an example in which anode foil 6 includes first dense part d1 in first part I.

In FIGS. 3 to 6, second part II includes anode part iia and separation part iib. Although second insulating material i2 is disposed on a surface of separation part iib, the present disclosure is not limited to this case, and separation part iib may include second insulating material i2 at least partially. For example, second insulating material i2 such as an insulating tape may be disposed on the surface of separation part iib, and a coating film of second insulating material i2 may be formed on the surface of separation part iib. Further, second insulating material i2 may be contained (for example, impregnated) in porous part 6*b* of separation part iib. Capacitor element 2 may include both second insulating material i2 disposed on the surface of separation part iib and second insulating material i2 included in separation part iib. Separation part iib including second insulating material i2 is provided between anode part iia and first part I as the cathode forming part in this manner, and thus, insulation between anode part iia and cathode part 8 can be more easily ensured.

Figure 3:
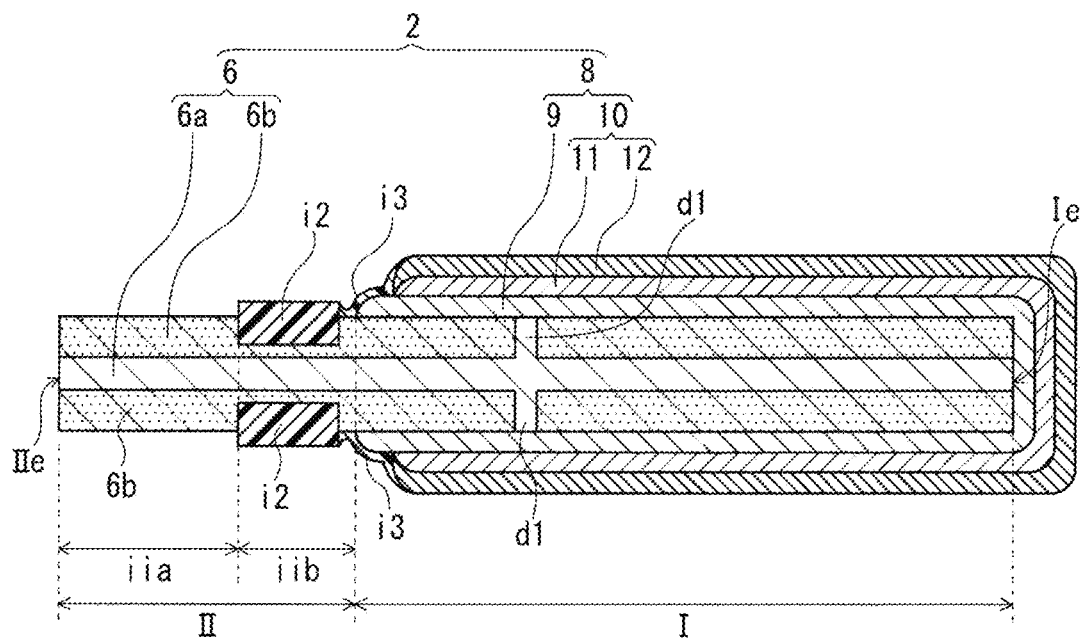
FIG. 3 is a cross-sectional view schematically illustrating a solid electrolytic capacitor element included in a solid electrolytic capacitor according to a second exemplary embodiment of the present disclosure.

In FIG. 3, second part II includes separation part iib, and third insulating material i3 is disposed to cover a recess (neck) formed between a part of second insulating material i2 on first part I side and cathode part 8. Third insulating material i3 covers at least a part of a region extending from a part of separation part iib on first part I side to a part of cathode part 8 on second part II side. The rest is the same as in FIG. 2, and the description of FIGS. 1 and 2 can be referred to.

Figure 4:
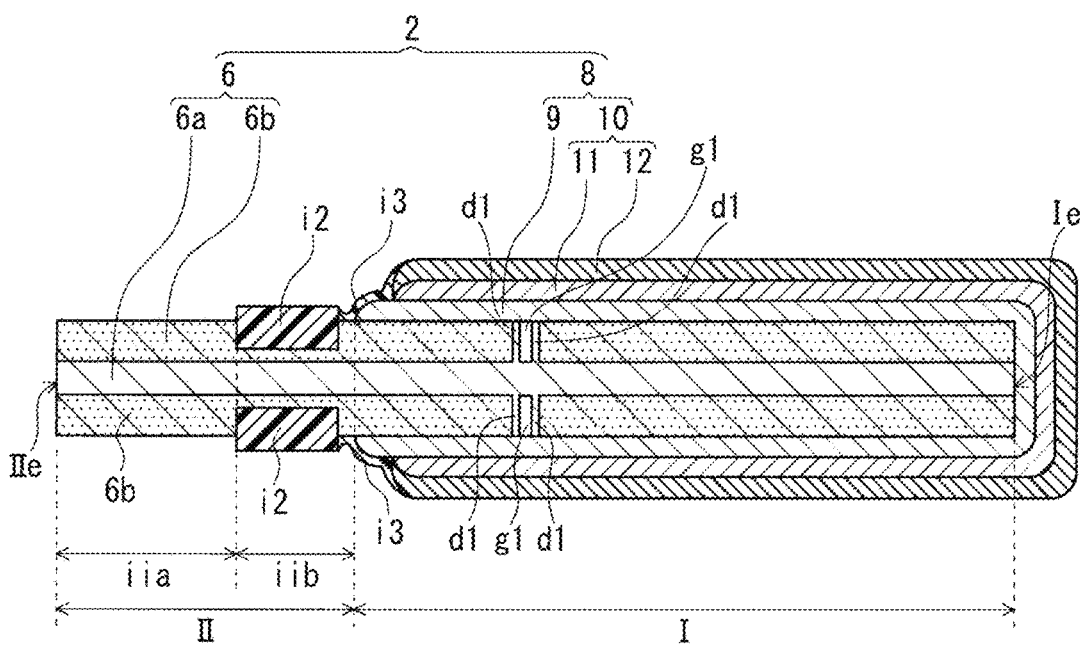
FIG. 4 is a cross-sectional view schematically illustrating a solid electrolytic capacitor element included in a solid electrolytic capacitor according to a third exemplary embodiment of the present disclosure.
Figure 5:
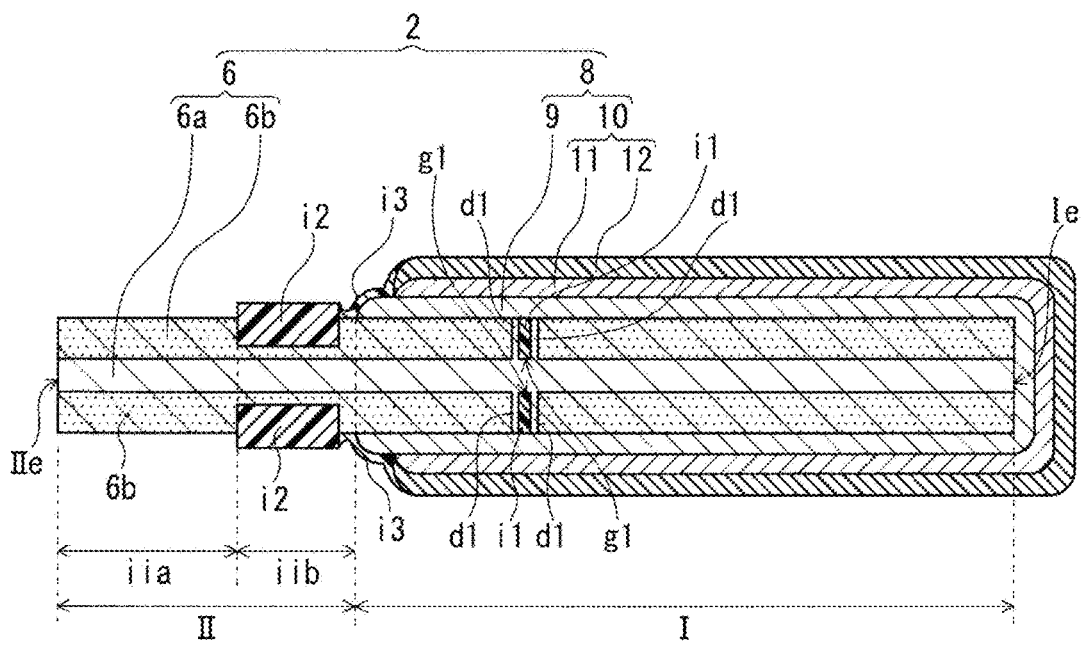
FIG. 5 is a cross-sectional view schematically illustrating a solid electrolytic capacitor element included in a solid electrolytic capacitor according to a fourth exemplary embodiment of the present disclosure.
Figure 6:
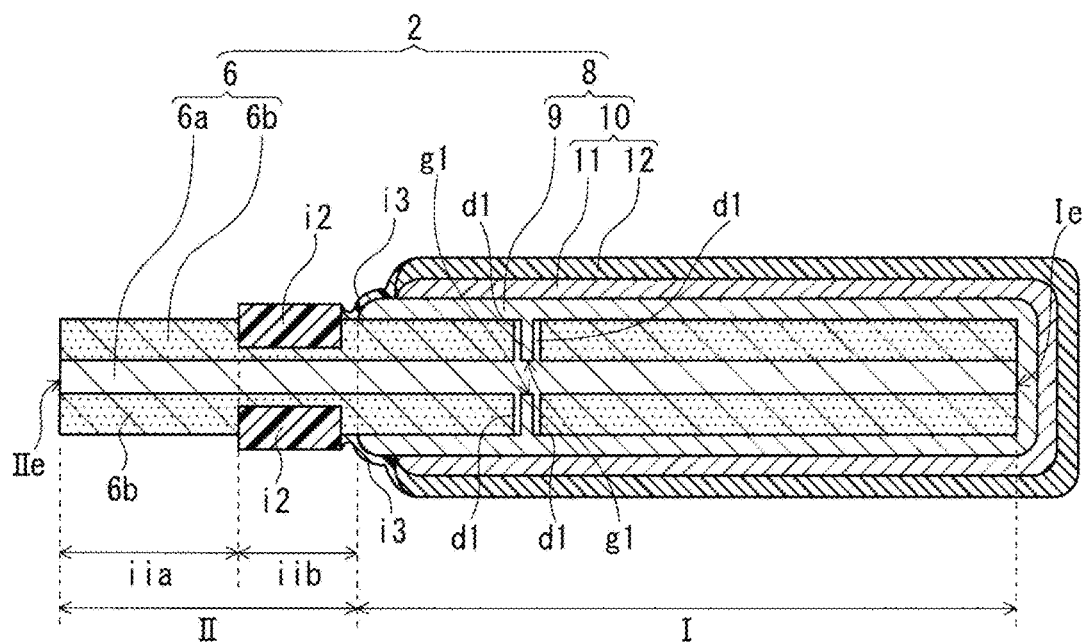
FIG. 6 is a cross-sectional view schematically illustrating a solid electrolytic capacitor element included in a solid electrolytic capacitor according to a fifth exemplary embodiment of the present disclosure.

FIGS. 4 to 6 are examples in which capacitor element 2 includes first groove g1 adjacent to first dense part d1. FIGS. 4 to 6 are the same as FIG. 3 except for the structures of first dense part d1 and first groove g1, and the description of FIG. 3 can be referred to. In FIGS. 4 to 6, capacitor element 2 includes first groove g1, and first dense part d1 provided in both a region on the second part side adjacent to first groove g1 and a region opposite to the second part side (in other words, first end Ie side). However, the present disclosure is not limited to this case, and first dense part d1 may be provided in any one of the regions.

In FIG. 4, capacitor element 2 includes first dense part d1 positioned in first part I and first groove g1 adjacent to first dense part d1. First dense part d1 is provided in both the region on second part II side adjacent to first groove g1 and the region on first end Ie side.

FIG. 5 is the same as FIG. 4 except that first groove g1 is filled with first insulating material i1, and the description of FIG. 4 can be referred to. First insulating material i1 may not be filled in first groove g1, and may cover at least a part of a region of first groove g1. The entry of air to the inside of capacitor element 2 from anode part iia side can be further reduced by covering at least a part of the region of first groove g1 with first insulating material i1, and stress applied to first groove g1 can be alleviated.

FIG. 6 is the same as FIG. 4 except that first groove g1 is filled with solid electrolyte layer 9, and the description of FIG. 4 can be referred to. Solid electrolyte layer 9 may not be filled in first groove g1, and may be disposed in at least a part of the region of first groove g1. Solid electrolyte layer 9 is disposed in at least a part of the region of first groove g1, and thus, it is possible to further reduce the entry of air from anode part iia side to the inside of capacitor element 2 and to alleviate stress applied to first groove g1.

Meanwhile, although not shown, both first insulating material i1 and solid electrolyte layer 9 may be disposed in first groove g1. For example, first groove g1 in a state where at least a part of an inner surface is covered with first insulating material i1 may be at least partially filled with solid electrolyte layer 9.

Although first dense part d1 and first groove g1 as shown in FIGS. 4 to 6 can be formed by the above-described method, when the first dense part and the first groove are formed by laser processing by using anode foil 6 including porous part 6*b* on the surface layer, since first dense part d1 and first groove g1 are formed simultaneously, it is advantageous in a process.

FIGS. 7 to 10 are cross-sectional views schematically illustrating capacitor element 2 included in a solid electrolytic capacitor according to sixth to ninth exemplary embodiments. These drawings show an example in which anode foil 6 includes second dense part d2 in anode part iia. In these drawings, the description of FIGS. 2 to 5 can be referred to except that second dense part d2 is provided in anode part iia instead of first dense part d1. The description of first dense part d1 in FIGS. 2 to 5 can also be referred to for second dense part d2 and the effect thereof.

Figure 7:
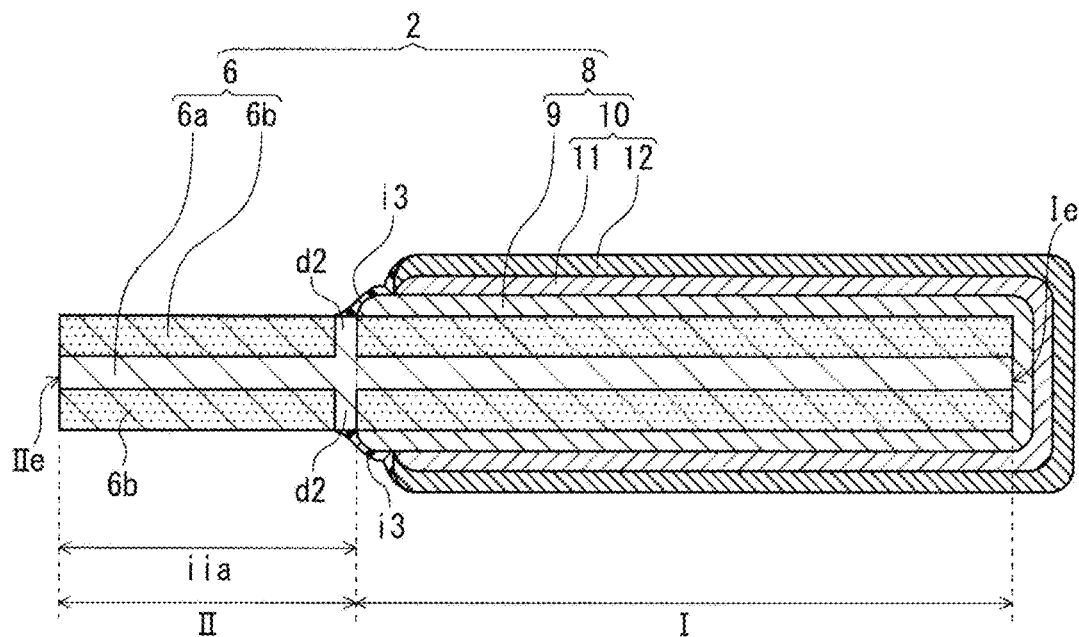
FIG. 7 is a cross-sectional view schematically illustrating a solid electrolytic capacitor element included in a solid electrolytic capacitor according to a sixth exemplary embodiment of the present disclosure.

FIG. 7 is the same as FIG. 2 except that second dense part d2 is provided in anode part iia instead of first dense part d1, and the description of FIG. 2 can be referred to.

Figure 8:
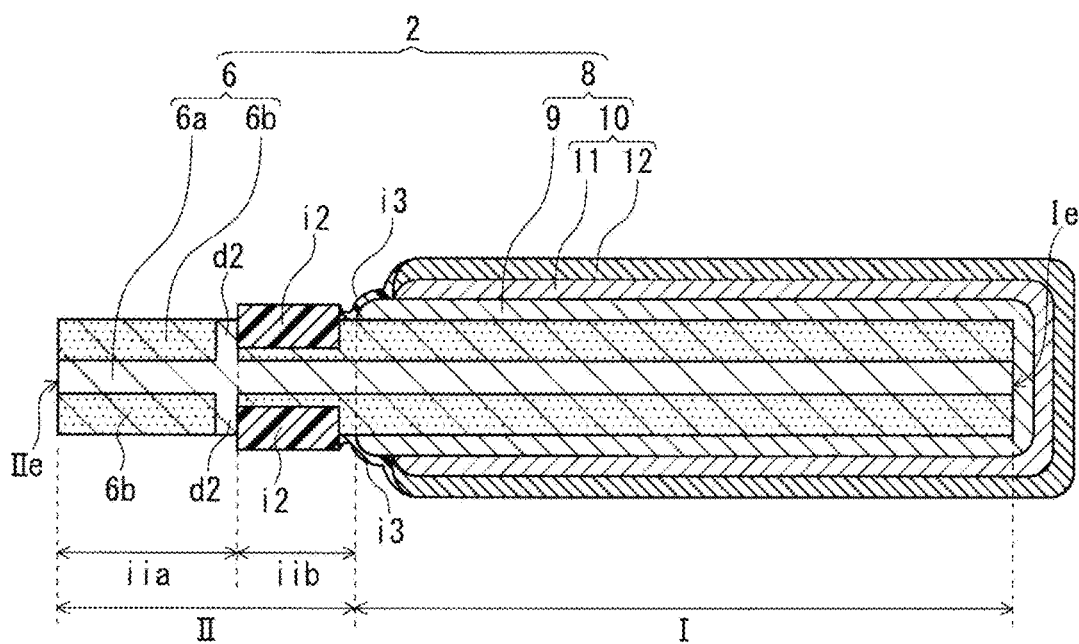
FIG. 8 is a cross-sectional view schematically illustrating a solid electrolytic capacitor element included in a solid electrolytic capacitor according to a seventh exemplary embodiment of the present disclosure.
Figure 9:
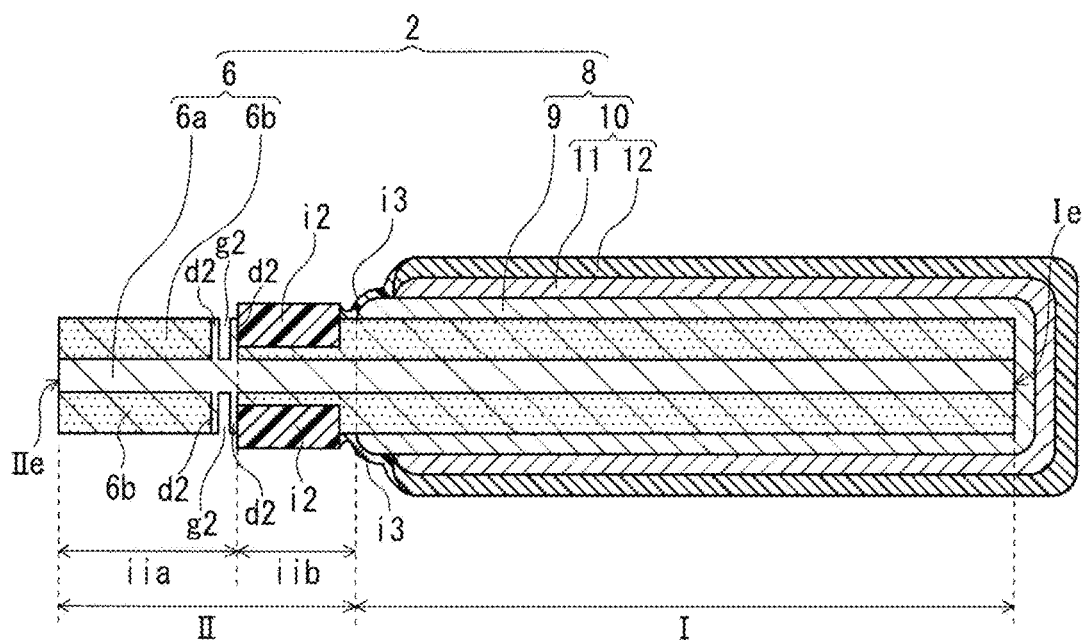
FIG. 9 is a cross-sectional view schematically illustrating a solid electrolytic capacitor element included in a solid electrolytic capacitor according to an eighth exemplary embodiment of the present disclosure.
Figure 10:
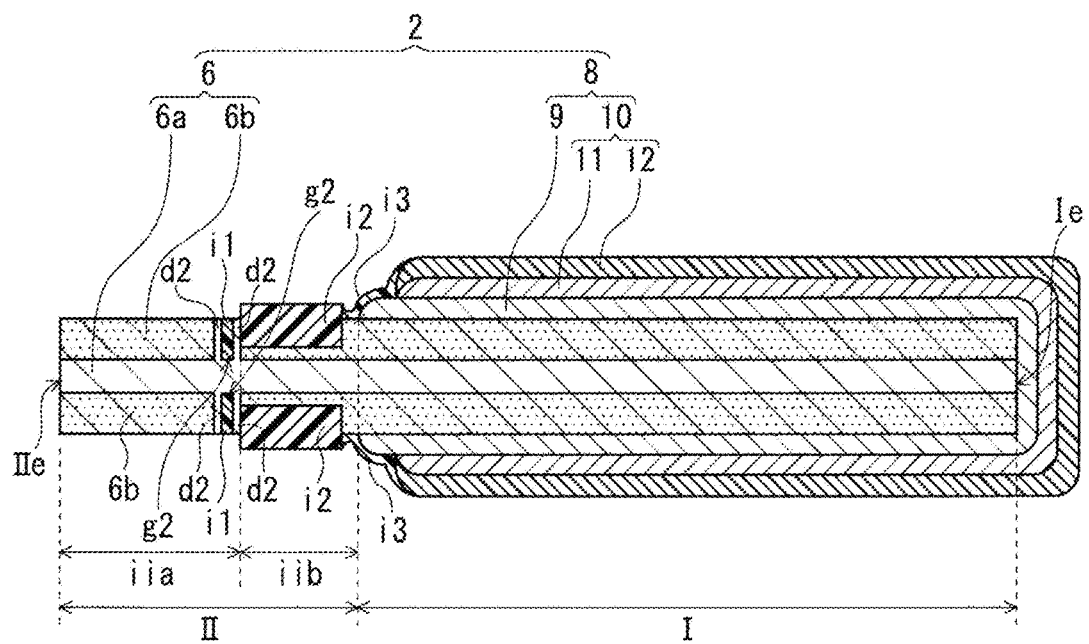
FIG. 10 is a cross-sectional view schematically illustrating a solid electrolytic capacitor element included in a solid electrolytic capacitor according to a ninth exemplary embodiment of the present disclosure.

In FIGS. 8 to 10, as in the case of FIGS. 3 to 5, second part II includes separation part iib. As in the case of FIGS. 3 to 5, separation part iib includes second insulating material i2 in at least a part thereof. Separation part iib and second insulating material i2 can be referred to the description of FIG. 3.

FIG. 8 is the same as FIG. 3 except that second dense part d2 is provided in anode part iia instead of first dense part d1, and the description of FIG. 3 can be referred to.

FIGS. 9 and 10 are examples in which capacitor element 2 includes second groove g2 adjacent to second dense part d2. These drawings are the same as those in FIGS. 4 and 5, respectively, except that second dense part d2 and second groove g2 are provided in anode part iia instead of first dense part d1 and first groove g1, and the description of FIGS. 4 and 5 can be referred to. The description of first groove g1 in FIGS. 4 and 5 can also be referred to for second groove g2.

In FIG. 10, as in the case of FIG. 5, second groove g2 is filled with first insulating material i1. The description of FIG. 5 can be referred to for first insulating material i1 and the effect thereof.

FIGS. 11 to 15 cross-sectional views schematically illustrating capacitor element 2 included in a solid electrolytic capacitor according to tenth to fourteenth exemplary embodiment. These drawings show an example in which anode foil 6 includes a dense part near a boundary between first part I and second part II. In these drawings, the dense part includes first dense part d1 positioned in first part I and second dense part d2 positioned in second part II (or third dense part d3 positioned in separation part iib). In a case where anode foil 6 has a groove, the groove is provided at and near a boundary between the first part and second part II, and such a groove is also referred to as first groove g1. In these drawings, the description of FIGS. 2 to 6 can be referred to except that the positions of the dense parts and first groove g1 are different. The dense parts and first groove g1, and the effects thereof can also be referred to the description of FIGS. 2 to 6.

Figure 11:
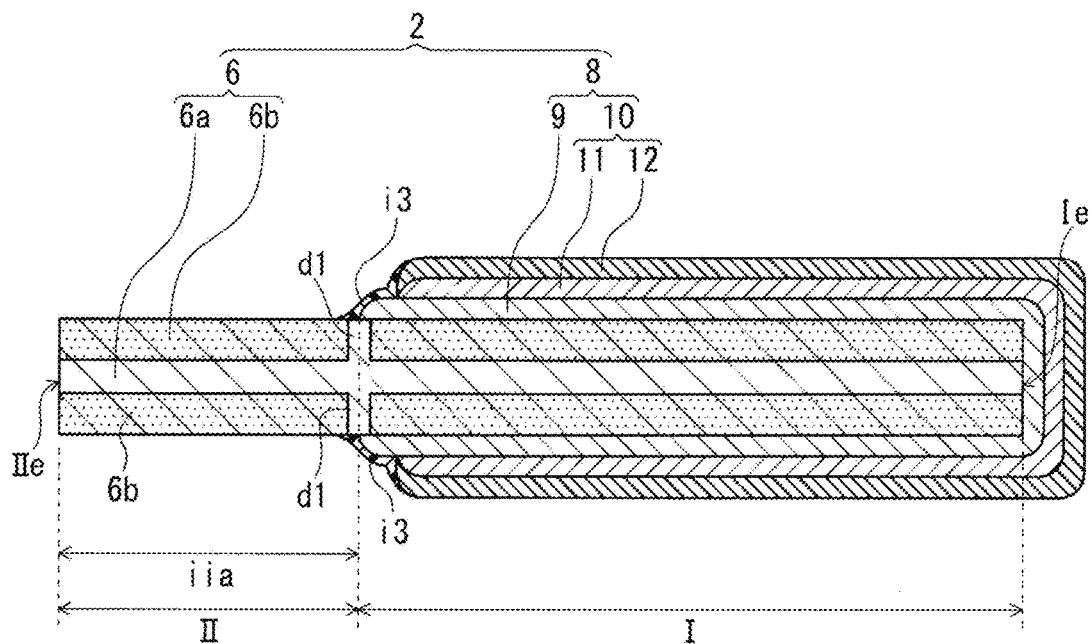
FIG. 11 is a cross-sectional view schematically illustrating a solid electrolytic capacitor element included in a solid electrolytic capacitor according to a tenth exemplary embodiment of the present disclosure.

In FIG. 11, first dense part d1 is provided at and near the boundary between first part I and second part II. The rest is the same as in FIG. 2, and the description of FIG. 2 can be referred to.

In FIGS. 12 to 15, as in the case of FIGS. 3 to 6, second part II includes separation part iib. As in the case of FIGS. 3 to 6, separation part iib includes second insulating material i2 in at least a part thereof. Separation part iib and second insulating material i2 can be referred to the description of FIG. 3.

Figure 12:
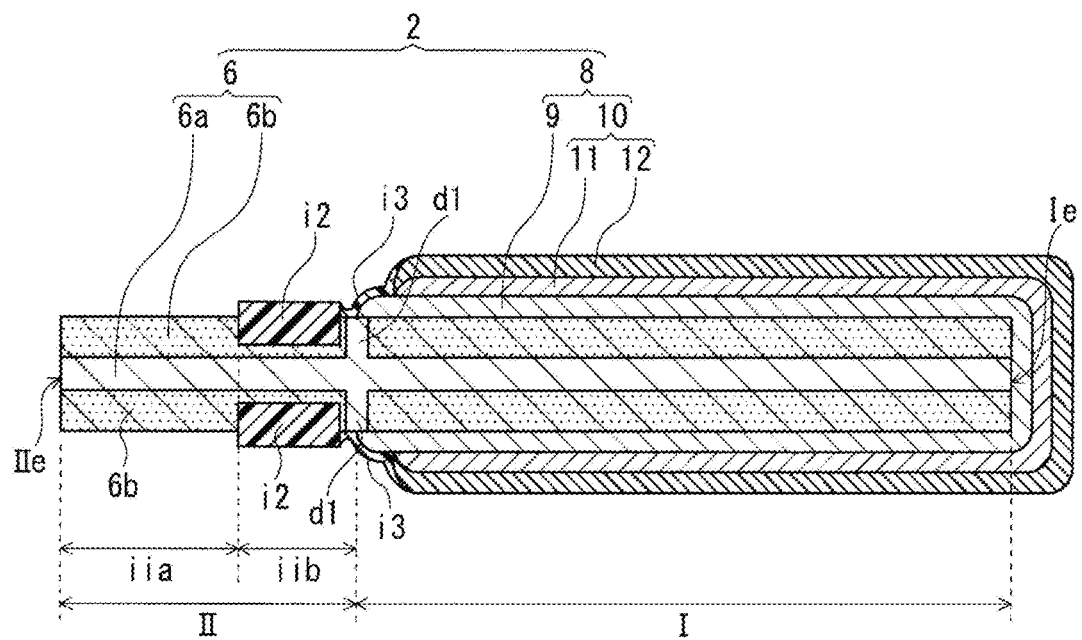
FIG. 12 is a cross-sectional view schematically illustrating a solid electrolytic capacitor element included in a solid electrolytic capacitor according to an eleventh exemplary embodiment of the present disclosure.

FIG. 12 is the same as FIG. 3 except that first dense part d1 is provided at and near a boundary between separation part iib and first part I, and the description of FIG. 3 can be referred to.

Figure 13:
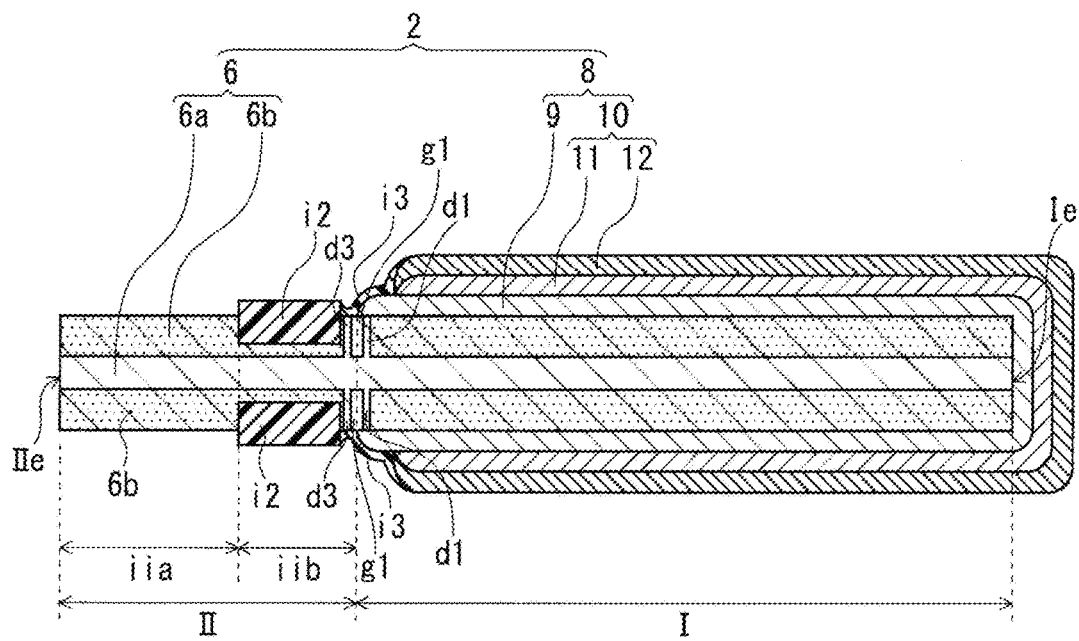
FIG. 13 is a cross-sectional view schematically illustrating a solid electrolytic capacitor element included in a solid electrolytic capacitor according to a twelfth exemplary embodiment of the present disclosure.
Figure 14:
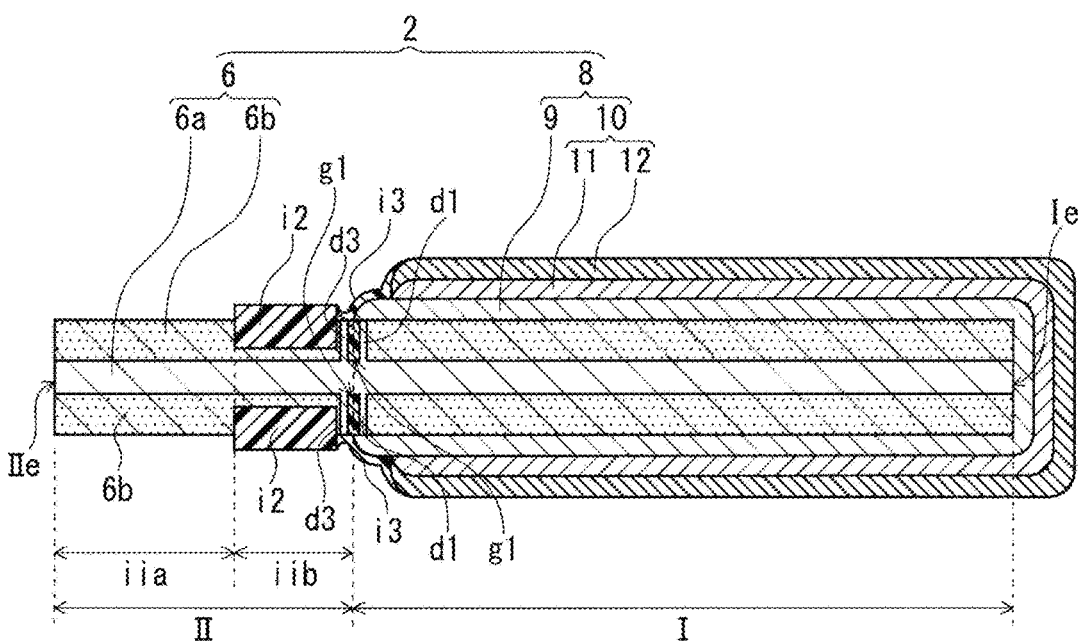
FIG. 14 is a cross-sectional view schematically illustrating a solid electrolytic capacitor element included in a solid electrolytic capacitor according to a thirteenth exemplary embodiment of the present disclosure.
Figure 15:
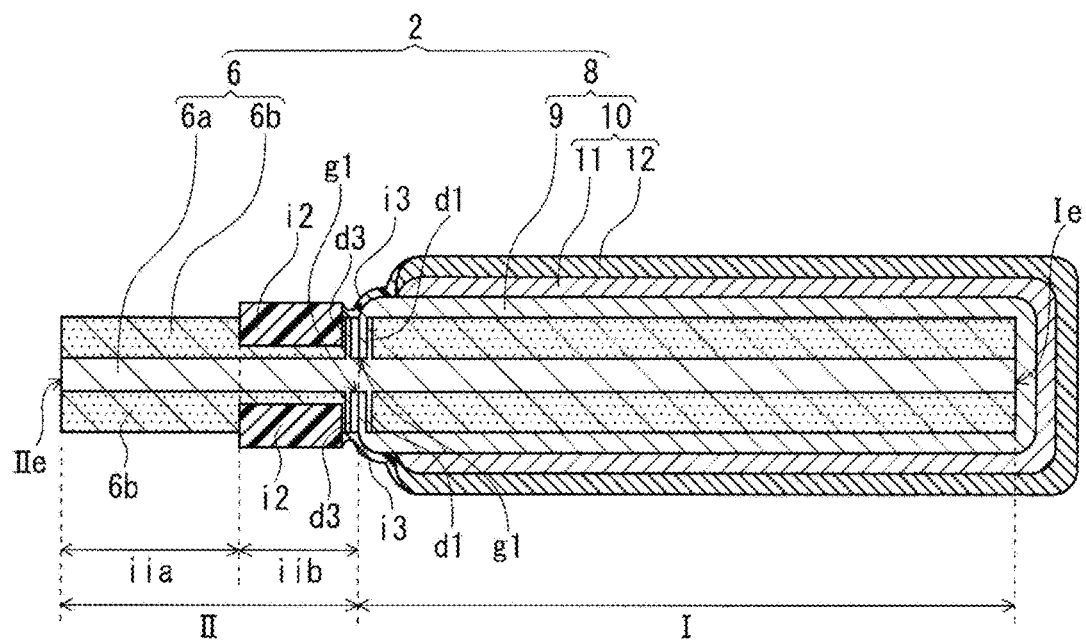
FIG. 15 is a cross-sectional view schematically illustrating a solid electrolytic capacitor element included in a solid electrolytic capacitor according to a fourteenth exemplary embodiment of the present disclosure.

FIGS. 13 to 15 show examples in which capacitor element 2 includes first groove g1 at and near the boundary between separation part iib and first part I, and includes first dense part d1 and third dense part d3 provided to sandwich first groove g1. These drawings are the same as those of FIGS. 4 to 6 except that the positions of the dense parts and first groove g1 are different, and the description of FIGS. 4 to 6 can be referred to. The description of first dense part d1 in FIGS. 4 to 6 can be referred to for third dense part d3.

In FIG. 14, as in the case of FIG. 5, second groove g2 is filled with first insulating material i1. The description of FIG. 5 can be referred to for first insulating material i1 and the effect thereof.

In FIG. 15, as in the case of FIG. 6, solid electrolyte layer 9 is partially filled in first groove g1. Solid electrolyte layer 9 may not be filled in first groove g1, and may be disposed in at least a part of the region of first groove g1. The effect of solid electrolyte layer 9 disposed in first groove g1 can be referred to the description in FIG. 6.

Meanwhile, although not shown, both first insulating material i1 and solid electrolyte layer 9 may be disposed in first groove g1. For example, first groove g1 in a state where at least a part of an inner surface is covered with first insulating material i1 may be at least partially filled with solid electrolyte layer 9.

Figure 16:
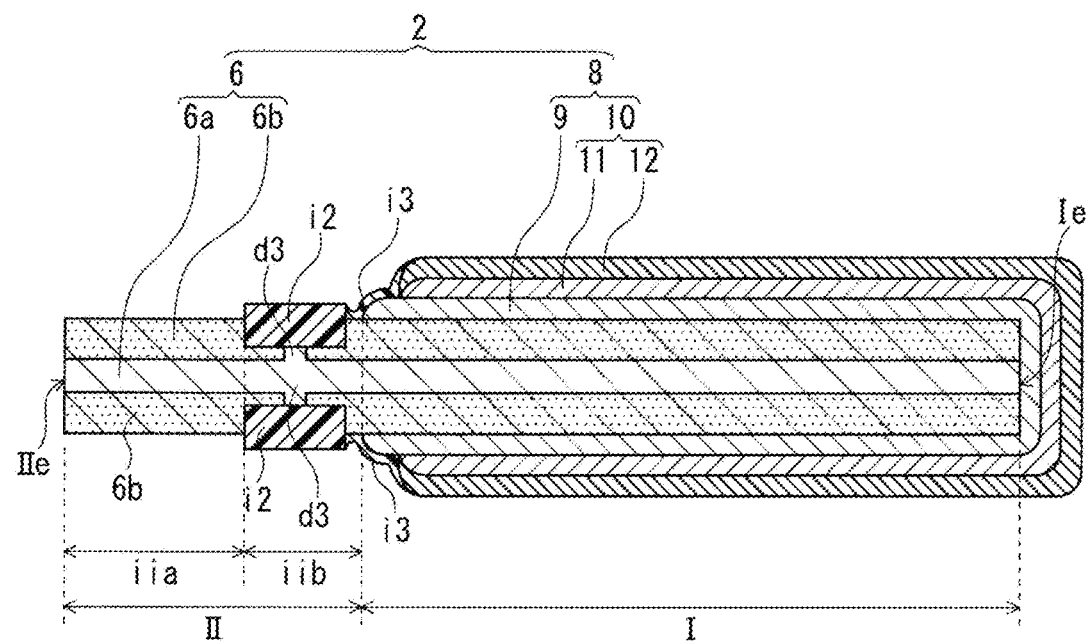
FIG. 16 is a cross-sectional view schematically illustrating a solid electrolytic capacitor element included in a solid electrolytic capacitor according to a fifteenth exemplary embodiment of the present disclosure.
Figure 17:
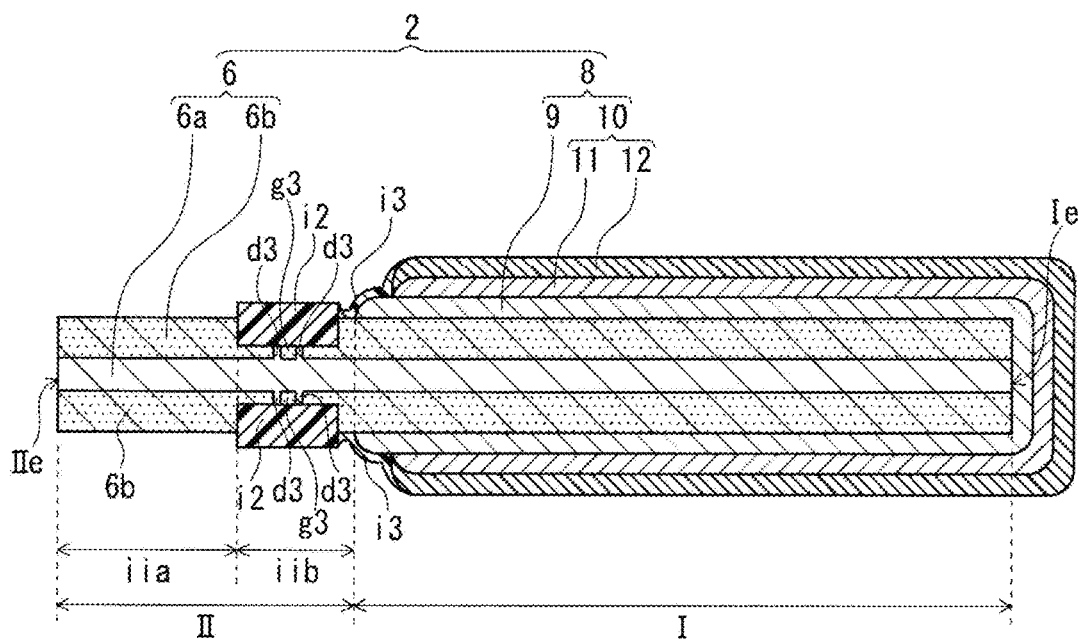
FIG. 17 is a cross-sectional view schematically illustrating a solid electrolytic capacitor element included in a solid electrolytic capacitor according to a sixteenth exemplary embodiment of the present disclosure.
Figure 18:
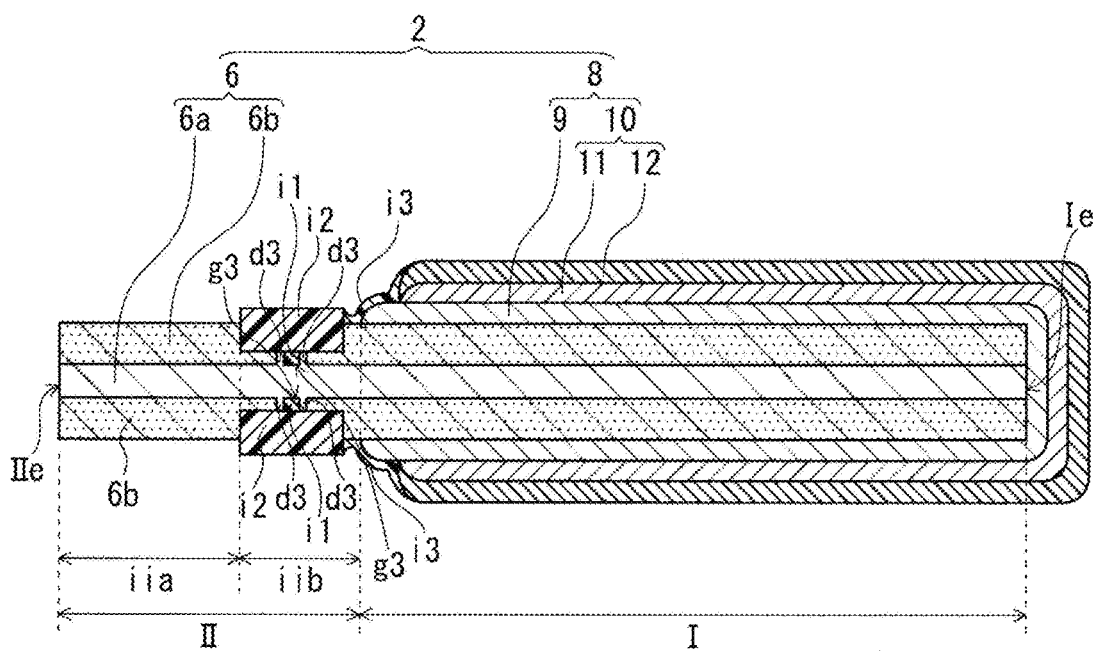
FIG. 18 is a cross-sectional view schematically illustrating a solid electrolytic capacitor element included in a solid electrolytic capacitor according to a seventeenth exemplary embodiment of the present disclosure.

FIGS. 16 to 18 are cross-sectional views schematically showing capacitor element 2 included in a solid electrolytic capacitor according to fifteenth to seventeenth exemplary embodiments. These drawings show an example in which anode foil 6 includes third dense part d3 in separation part iib. In these drawings, second insulating material i2 is disposed on the surface of separation part iib, and third dense part d3 is provided in a region of separation part iib covered with second insulating material i2. In these drawings, the description of FIGS. 3 to 5 can be referred to except that third dense part d3 is provided in the region of separation part iib covered with second insulating material i2 instead of first dense part d1. The description of first dense part d1 in FIGS. 3 to 5 can also be referred to for third dense part d3 and the effect thereof.

FIG. 16 is the same as FIG. 3 except that third dense part d3 is provided in the region of separation part iib covered with second insulating material i2 instead of first dense part d1, and the description of FIG. 3 can be referred to.

FIGS. 17 and 18 show examples in which capacitor element 2 includes third groove g3 adjacent to second dense part d2. In these drawings, the same as in each of FIGS. 4 and 5 except that third dense part d3 and third groove g3 are provided in the region of separation part iib covered with second insulating material i2 instead of first dense part d1 and first groove g1, and the description of FIGS. 4 and 5 can be referred to. The description of first groove g1 in FIGS. 4 and 5 can be referred to for third groove g3.

In FIG. 18, as in the case of FIG. 5, third groove g3 is filled with first insulating material i1. The description of FIG. 5 can be referred to for first insulating material i1 and the effect thereof.

In FIGS. 16 to 18, an example in which third dense part d3 is provided in the region of separation part iib covered with second insulating material i2 is shown, but the present disclosure is not limited to such a case. For example, although not shown, in separation part iib, third dense part d3 may be provided between second insulating material i2 and first part I. As in the case of FIGS. 16 to 18, second insulating material i2 may be disposed on the surface of separation part iib, or may be contained (for example, impregnated) in the porous part of separation part iib. In this case, third groove g3 may also be provided adjacent to third dense part d3. At least a part of a region of third groove g3 may be covered with first insulating material i1.

Note that in FIGS. 2, 7, and 11 illustrating the exemplary embodiments having no separation part, the case where the dense part which is the non-roughened part or the molten part is formed is shown, but the present disclosure is not limited to the case where such a dense part is provided. For example, in FIG. 2, as shown in FIGS. 4 to 6, first groove g1 may be provided, and at least one of first insulating material i1 and solid electrolyte layer 9 may be disposed in first groove g1. Similarly, in FIG. 7, as shown in FIGS. 9 and 10, groove g2 may be provided, and first insulating material i1 may be disposed in second groove g2. In addition, in FIG. 11, as shown in FIGS. 13 to 15, first groove g1 may be provided, and at least one of first insulating material i1 and solid electrolyte layer 9 may be disposed in first groove g1.

In FIGS. 8 to 10, the case where second groove g2 is provided at an end of anode part iia on separation part iib side is shown, but second groove g2 may be provided at and near a boundary between anode part iia and separation part iib. Un these cases, first insulating material i1 may also be disposed in second groove g2.

Hereinafter, a configuration of the solid electrolytic capacitor will be described in more detail. The descriptions are contents common to the solid electrolytic capacitor of the present disclosure including the above specific exemplary embodiment, and do not limit only the above specific exemplary embodiment.

(Capacitor Element)

The capacitor element includes the anode foil, the dielectric layer, and the cathode part. The cathode part includes the solid electrolyte layer and the cathode lead-out layer covering the solid electrolyte layer. The capacitor element may include at least one selected from the group consisting of the above first insulating material, second insulating material, and third insulating material.

(Anode Foil)

The anode foil can include a valve metal, an alloy containing a valve metal, a compound including a valve metal, and the like. These materials can be used singly or in combination of two or more kinds thereof. As the valve metal, for example, aluminum, tantalum, niobium, and titanium are preferably used. The anode foil having the porous part in the surface layer is obtained, for example, by roughening the surface of the metal foil containing the valve metal.

(Dielectric Layer)

The dielectric layer is an insulating layer that functions as a dielectric material. The dielectric layer is formed by anodizing the valve metal of the surface of the anode foil. The dielectric layer only needs to be formed so as to cover at least a part of the anode foil. The dielectric layer is usually formed on the surface of the anode foil. Since the dielectric layer is formed on the surface of the porous part of the anode foil, the dielectric layer is formed along inner wall surfaces of holes and hollows (also referred to as pits) in the surface of the anode foil.

The dielectric layer contains an oxide of a valve metal. For example, in a case where tantalum is used as the valve metal, the dielectric layer contains $Ta_2O_5$, and in a case where aluminum is used as the valve metal, the dielectric layer contains $Al_2O_3$. Note that the dielectric layer is not limited thereto, and any dielectric layer may be used as long as the dielectric layer functions as a dielectric material.

(Insulating Material)
(First Insulating Material)

An insulating resin (may be referred to as a first insulating resin.) or the like is used as the first insulating material. From the viewpoint of easily securing high penetration of the first insulating material into the groove, the first insulating material is preferably a cured product (including a half-cured product) of a curable resin or a composition thereof. The curable resin may be thermosetting or photocurable. Examples of the photocurable resin or the composition thereof include resins cured by ultraviolet rays, or visible light. From the viewpoint of easily penetrating the first insulating material into the groove, it is preferable to use a photocurable (in particular, ultraviolet curability) resin or a composition thereof. The curable resin composition may contain, for example, at least one selected from the group consisting of a curing agent, a curing accelerator, a catalyst, and an additive agent in addition to the curable resin.

Examples of the curable resin (may be referred to as a first curable resin.) used as the first insulating material include an epoxy resin, a phenol resin, an unsaturated polyester resin, a thermosetting polyurethane resin, and a thermosetting polyimide, and are not limited thereto. The first curable resin may be used alone, or may be used in combination of two or more kinds thereof. The first curable resin may be a one-component curable resin or a two-component curable resin.

(Second Insulating Material)

An insulating resin (may be referred to as a second insulating resin.) or the like is used as the second insulating material. The second insulating material may contain one kind or two or more kinds of second insulating resins.

Examples of the second insulating material disposed on the surface of the separation part include an insulating tape (resist tape or the like) containing a second insulating resin, and a coating film containing a second insulating resin, but are not limited thereto. The second insulating resin contained in such a second insulating material may be a thermoplastic resin (or a thermoplastic resin composition), or may be a curable resin (may be referred to as a second curable resin.) or a cured product (including a half-cured product) of the composition thereof. Examples of the thermoplastic resin as the second insulating resin include polyolefins, polyesters, polyamides, and thermoplastic polyimides. The second curable resin may be thermosetting or photocurable. Examples of the photocurable resin or the composition thereof include resins cured by ultraviolet rays, or visible light. Examples of the second curable resin or the composition thereof include an epoxy resin, polyimide, and photoresist. The composition of the second curable resin may contain, for example, at least one selected from the group consisting of a curing agent, a curing accelerator, a catalyst, and an additive agent in addition to the second curable resin.

In a case where the porous part of the separation part contains the second insulating material, examples of such a second insulating material include materials described for the first insulating material. From the viewpoint of easily impregnating the voids of the porous part with the curable resin or the composition, it is preferable to use the curable resin (also referred to as the second curable resin.) or the composition thereof, particularly the photocurable (in particular, ultraviolet curability) resin or the composition thereof. As such a second curable resin, the description of the first curable resin can be referred to. The second insulating material may be the same as or different from the first insulating material.

(Third Insulating Material)

An insulating resin (also referred to as a third insulating resin.) or the like is used as the third insulating material. The third insulating material may be a thermoplastic resin, or may be a curable resin (also referred to as a third curable resin.) or a cured product (including a half-cured product) of a composition thereof. The third insulating material may contain one kind or two or more kinds of third insulating resins.

Examples of the thermoplastic resin as the third insulating resin include at least one selected from the group consisting of vinyl resin (for example, vinyl chloride, vinyl acetate, and aromatic vinyl resin), polyolefin (for example, polyethylene and polypropylene), acrylic resin, polyamide, polycarbonate, thermoplastic polyimide, and polyamide-imide. Examples of the aromatic vinyl resin include polystyrene and an acrylonitrile-butadiene-styrene copolymer (ABS resin).

As the third curable resin, the description of the first curable resin can be referred to.

The third insulating material may be the same as or different from the first insulating material. The third insulating material may be the same as or different from the second insulating material.

(Cathode Part)

The cathode part includes a solid electrolyte layer and a cathode lead-out layer. The solid electrolyte layer covers at least a part of the dielectric layer. The cathode lead-out layer covers at least a part of the solid electrolyte layer. The cathode part is formed on at least a part of the surface of the first part of the anode foil with a dielectric layer interposed therebetween. Hereinafter, the solid electrolyte layer and the cathode lead-out layer will be described.

(Solid Electrolyte Layer)

The solid electrolyte layer is formed on the surface of the first part of the anode foil. In a case where the anode foil has the first groove, the solid electrolyte layer may be disposed in at least a part of the region of the first groove.

The solid electrolyte layer contains a conductive polymer. The solid electrolyte layer may further contain at least one selected from the group consisting of a dopant and other additive agents as necessary. Examples of the dopant include p-toluenesulfonic acid, naphthalenesulfonic acid, and polystyrenesulfonic acid (PSS), and are not limited thereto.

For example, a π-conjugated polymer can be used as the conductive polymer. Examples of the conductive polymer include polymers having polypyrrole, polythiophene, polyaniline, polyfuran, polyacetylene, polyphenylene, polyphenylene vinylene, polyacene, and polythiophene vinylene as a basic skeleton. The polymer also includes a homopolymer, a copolymer of two or more kinds of monomers, and derivatives of these polymers (a substitute having a substituent group). For example, polythiophene includes poly (3,4-ethylenedioxythiophene) and the like. However, these components are merely specific examples, and the conductive polymer is not limited to these specific examples.

The solid electrolyte layer may be formed to cover at least a part of the dielectric layer. The solid electrolyte layer may be formed directly on the dielectric layer or may be formed with a conductive precoat layer interposed therebetween. The precoat layer is formed of a conductive material (conductive polymer, inorganic conductive material, and the like), for example. The conductive material forming the precoat layer is not particularly limited, and a known material can be used, for example.

(Cathode Lead-Out Layer)

The cathode lead-out layer only needs to include at least a first layer that is in contact with the solid electrolyte layer and covers at least a part of the solid electrolyte layer, and may include a first layer and a second layer covering the first layer. Examples of the first layer include a layer containing conductive particles and a metal foil. Examples of the conductive particles include at least one selected from conductive carbon and metal powder. For example, the cathode lead-out layer may include a layer (also referred to as a carbon layer) containing conductive carbon as the first layer, and a layer containing metal powder or a metal foil as the second layer. In a case where a metal foil is used as the first layer, this metal foil may constitute the cathode lead-out layer.

Examples of the conductive carbon include graphite (artificial graphite, natural graphite, and the like).

The layer containing metal powder as the second layer can be formed, for example, by stacking a composition containing metal powder on a surface of the first layer. Examples of such a second layer include a metal paste layer formed using a composition containing metal powder such as silver particles and a resin (binder resin). As the resin, although a thermoplastic resin can be used, a thermosetting resin such as an imide resin or an epoxy resin is preferably used.

In a case where a metal foil is used as the first layer, the type of metal is not particularly limited, but it is preferable to use a valve metal such as aluminum, tantalum, or niobium, or an alloy containing the valve metal. A surface of the metal foil may be roughened as necessary. On the surface of the metal foil may be provided an anodization film, a coating film of a metal (different type of metal) different from the metal that constitutes the metal foil, or a nonmetal film. Examples of the different type of metal and nonmetal include metals such as titanium and nonmetals such as carbon (conductive carbon or the like).

A coating film of the different type of metal or nonmetal (for example, conductive carbon) may be used as the first layer, and the metal foil may be used as the second layer.

(Separation Part)

In a case where the metal foil is used for the cathode lead-out layer, a separation part may be disposed between the metal foil and the anode foil. The separation part is not particularly limited. For example, it is possible to use an unwoven fabric including fibers of cellulose, polyethylene terephthalate, vinylon, or polyamide (for example, aliphatic polyamide or aromatic polyamide such as aramid).

(Others)

The solid electrolytic capacitor may be a wound type, or may be either a chip type or a stacked type. For example, the solid electrolytic capacitor may include a stack body of two or more capacitor elements. The configuration of the capacitor element may be selected in accordance with the type of the solid electrolytic capacitor.

In the capacitor element, one end of the cathode lead terminal is electrically connected to the cathode lead-out layer. The cathode lead terminal is joined to the cathode layer with, for example, a conductive adhesive applied onto the cathode layer interposed therebetween. One end of the anode lead terminal is electrically connected to the anode foil. As the lead terminals, a lead terminal used in a solid electrolytic capacitor can be used without particular limitation, and a so-called lead frame may be used, for example. Examples of the material of each lead terminal include a metal (copper or the like) or an alloy thereof.

The solid electrolytic capacitor includes, for example, a capacitor element and a resin exterior body or a case for sealing the capacitor element. Examples of the case include a combination of a container such as a bottomed case and a sealing body that seals an opening of the container. Examples of the material forming each of the container and the sealing body include a metallic material and a resin material.

The resin exterior body preferably contains a cured product of a curable resin composition, and may contain a thermoplastic resin or a composition containing the thermoplastic resin. The curable resin composition contains, for example, a curable resin and a filler. The curable resin is preferably a thermosetting resin. Examples of the resin material forming the case include a thermoplastic resin or a composition containing the thermoplastic resin. Examples of the metallic material forming the case include metals such as aluminum, copper, and iron, or alloys thereof (also including stainless steel, brass, and the like).

In the capacitor element, the other end of the anode lead terminal and the other end of the cathode lead terminal are sealed in a state of being led out from the resin exterior body or the case, respectively. The other end of each terminal exposed from the resin exterior body or the case is used for, for example, solder connection to a substrate (not shown) on which the solid electrolytic capacitor is to be mounted.

[Method for Producing Solid Electrolytic Capacitor]

Hereinafter, a method for producing the solid electrolytic capacitor will be described. The descriptions are contents common to the solid electrolytic capacitor of the present disclosure including the above specific exemplary embodiment, and do not limit only the above specific exemplary embodiment.

The solid electrolytic capacitor can be produced, for example, by a producing method including a step of preparing a capacitor element (first step), a step of electrically connecting a lead terminal to the capacitor element (second step), and a step of covering a part of the capacitor element and the lead terminal with an exterior body (third step).

Hereinafter, each step will be described in more detail.

(First Step)

In the first step, the capacitor element is produced. The first step can include (i) a step of forming an anode foil, (ii) a step of forming a dielectric layer, (iii) a step of forming a solid electrolyte layer, and (iv) a step of forming a cathode lead-out layer. The first step may include (v) a step of forming a dense part in the anode foil, and may include (vi) a step of forming a groove adjacent to the dense part. Each of step (v) of forming the dense part and step (vi) of forming the groove may be performed in step (i), or may be performed in a step different from step (i). In a case where the groove is formed in the anode foil in step (vi), the first step may further include (vii) a step of applying a first insulating material to at least a part of a region of the groove. In addition, the first step may further include (viii) a step of providing a separation part by applying a second insulating material to a region between an anode part and a first part. The first step may further include (ix) a step of applying a third insulating material to a neck.

((i) Step of Forming Anode Foil)

In this step, an anode foil including a porous part is formed. The anode foil includes a first part that is a cathode forming part and a second part including at least an anode part. The porous part can be formed, for example, by roughening a surface of a metal foil containing a valve metal, and is provided in a surface layer of an anode foil. A base material part that is not roughened is formed inside the metal foil, and the porous part is formed on a surface of the base material part. The roughening may be performed as long as irregularities can be formed on the surface layer of the metal foil, and may be performed by etching (for example, electrolytic etching) the surface of the metal foil, for example.

Step (v) may be performed as a substep of step (i) to form an anode foil having a dense part in step (i). Meanwhile, in a case where the groove adjacent to the dense part are formed in the anode foil, groove formation step (vi) may be performed as a substep of step (i). Either step (v) or step (vi) may be performed first, or may be performed simultaneously.

The dense part is formed in a surface layer of the anode foil. The dense part may be formed by performing roughening by using a mask, or may be formed by melting the porous part. The former method may be referred to as method A, and the latter method may be referred to as method B.

In method A, the dense part can be formed together with the formation of the porous part by, for example, disposing a mask on a part of a surface of the metal foil to roughen the surface. In a region protected by the mask on the surface of the metal foil (in other words, a non-roughened part (a non-etched part or the like)), the dense part is formed by suppressing roughening.

In a case where the groove adjacent to the dense part is provided, for example, the groove can be formed by grooving at least one region selected from the group consisting of a region in a part of the dense part and a region adjacent to the dense part of the porous part. Meanwhile, the dense part around the groove may be formed by grooving at least the surface layer of the metal foil, and then by performing roughening in a state that the groove and a part around the groove are protected by the mask. Examples of the groove processing include mechanical grooving using a blade or the like and laser processing. After the groove is formed, the part around the groove of the anode foil may be heated and melted as necessary. By melting the constituent components of the anode foil, the dense part can be newly formed around the groove, or the structure of the already formed dense part can be further densified.

In method B, the dense part can be formed, for example, by roughening the surface of the metal foil to form the porous part in the surface layer, and then by heating and melting a part of the surface layer (for example, the porous part) of the metal foil. Note that a part of the base material part may be heated and melted in addition to the surface layer.

In a case where the groove adjacent to the dense part is provided, for example, the groove is formed in the porous part by grooving while the part around the groove of the porous part is melted. Accordingly, the dense part may be formed in a region adjacent to the groove. Examples of the groove processing include mechanical grooving using a blade or the like and laser processing.

After the porous part is formed in the surface layer of the metal foil, the groove is formed at least on the surface layer (such as the porous part) by laser processing. In this case, when the groove is formed by adjusting conditions of the laser processing, the part around the groove of the anode foil is melted to form the dense part. In other words, in a case where laser processing is used, the formation of the groove and the formation of the dense part can be simultaneously performed by irradiation with a laser beam. After the groove is formed by laser processing, as necessary, a dense part may be newly formed or the structure of the already formed groove may be further densified by further heating and melting the part around the groove.

For example, a pulse laser is preferably used for the laser processing. By using the pulse laser, it is easy to form the groove and the dense part simultaneously in a well-balanced manner.

Pulse energy is, for example, in a range from 1 µJ to 20 µJ, inclusive, may be in a range from 3 µJ to 15 µJ, inclusive, or may be in a range from 5 µJ to 10 µJ, inclusive. In a case where the pulse energy is in such a range, it is easy to form the groove and the dense part simultaneously in a well-balanced manner.

In a case where a separation part is provided in the anode foil, in this step, a recess (except for the third groove) may be formed in a region between the anode part and the first part of the anode foil, which corresponds to the separation part. For example, a second insulating material is disposed on a surface of the formed recess in step (vii) to be described later. Such a recess can be formed, for example, by compressing or removing at least a part of the porous part in the region between the anode part and the first part of the anode foil. Compression and removal may be combined as necessary. The compression can be performed by press working or the like. The removal of the porous part can be performed by mechanical groove processing, laser processing, or the like.

Note that the recess is not necessarily formed in this step, and may be formed after this step and before the second insulating material is disposed on the surface.

((ii) Step of Forming Dielectric Layer)

In this step, a dielectric layer is formed on the anode foil. The dielectric layer is formed by anodizing the anode foil. The anodizing may be performed by a known method such as an anodizing treatment. The anodizing treatment can be performed, for example, by immersing the anode foil in an anodizing solution and applying a voltage between the anode foil as an anode and a cathode immersed in the anodizing solution. As the anodizing liquid, for example, a phosphoric acid aqueous solution or the like is preferably used.

Note that step (ii) may be performed at one stage or at multiple stages. For example, in a case where step (vi) is performed after step (ii), it is preferable to perform step (ii) again after step (vi). Similarly, in a case where the above recess is formed after step (ii), step (ii) may be performed again after the recess is formed as necessary. Note that step (ii) is performed before step (iii), step (iv), and steps (vii) to (ix).

((v) Step of Forming Dense Part and (vi) Step of Forming Groove)

Each of steps (v) and (vi) may be performed before step (iii) and steps (vii) to (ix), may be performed after step (ii), or may be performed as a substep in step (i) as described above. For example, in the case of the above-described method B, the anode foil that includes the porous part in the surface layer and includes the first part and the second part may be formed in step (i), and step (v) and step (vi) as necessary may be performed after step (ii). In method B, in step (v), the dense part is formed by heating and melting a part of the surface layer (for example, the porous part) of the anode foil. For steps (v) and (vi), the description for each step in step (i) can be referred to.

((vii) Step of Applying First Insulating Material)

In a case where the anode foil includes the groove adjacent to the dense part, the first insulating material is applied to at least a part of the region of the groove. Step (vii) is usually performed after step (ii) and step (vi) and before step (iii).

The first insulating material may be applied to cover at least a part of the groove. For example, the groove may be impregnated or filled with the first insulating material. When the first insulating material is applied to the first groove, the first insulating material may also be applied to a part around the first groove. For example, the first insulating material may be attached to a surface of the part around the groove, or may be impregnated into the porous part around the groove.

The application of the first insulating material is performed by using a known method, for example, at least one selected from the group consisting of a coating method or a dispensing method using various coaters or dispensers, immersion, and transfer (roller transfer or the like).

The first insulating material is applied to the groove in a flowable state. In a case where the first insulating material covering at least a part of the region of the groove is a cured product of a curable resin or a composition thereof, the curable resin or the composition thereof may be applied. In addition, a treatment liquid (specifically, a solution or a dispersion (coating agent or the like)) containing the first insulating material and a liquid medium may be applied to the groove to dry the liquid medium. From the viewpoint of easily filling the groove with the first insulating material in a large amount, it is preferable to supply a solvent-free curable resin or a composition as the first insulating material to the groove.

The curable resin or the composition thereof applied to the groove may be cured in at least one of this step and the subsequent step as necessary.

((viii) Step of Providing Separation Part by Applying Second Insulating Material)

In step (viii), the second insulating material is applied to the region between the anode part and the first part, and the separation part including the second insulating material is provided at least partially. Step (viii) is performed after step (ii) and before step (iii). Step (viii) is performed before step (iii), and thus, it is possible to suppress the conductive polymer from creeping up to the anode part side when the solid electrolyte layer is formed.

The second insulating material is provided in the region between the anode part and the first part, for example, by disposing the second insulating material on the surface of the anode foil or impregnating the porous part with the second insulating material. In a case where the recess other than the third groove is formed between the anode part and the first part by compression or removal of the porous part, the second insulating material may be disposed on the surface of the recess.

More specifically, for example, in the region between the anode part and the first part, the second insulating material may be disposed by bonding an insulating tape (resist tape or the like) to the surface of the anode foil. Meanwhile, in a case where the second insulating material is a cured product of a curable resin or a composition thereof, the second insulating material may be disposed by applying the curable resin or the composition thereof onto the surface of the anode foil. Further, the second insulating material may be disposed by applying a treatment liquid (specifically, a solution or a dispersion (coating agent or the like)) containing the second insulating material and a liquid medium onto the surface of the anode foil and drying the treatment liquid.

Meanwhile, the porous part may contain the second insulating material by impregnating the porous part with the second insulating material (for example, a treatment liquid (coating agent or the like) containing a curable resin or a composition thereof and a second insulating material) in a flowable state in at least a part of the region between the anode part and the first part.

The second insulating material may be disposed on the surface of the anode foil, and the porous part may be impregnated with the second insulating material in a flowable state. The second insulating material disposed on the surface of the anode foil and the second insulating material with which the porous part is impregnated may be the same or different. Either the disposition of the second insulating material or the impregnation of the second insulating material may be performed first.

In a case where the curable resin or the composition thereof is used as the second insulating material, the second insulating material may be cured in at least one of this step and the subsequent step as necessary.

((iii) Step of Forming Solid Electrolyte Layer)

In this step, the solid electrolyte layer is formed to cover at least a part of the dielectric layer.

The solid electrolyte layer is formed, for example, by polymerizing a precursor on the dielectric layer using a treatment liquid containing the precursor of the conductive polymer. The polymerization can be performed by at least one of chemical polymerization and electrolytic polymerization. In the case of electrolytic polymerization, a conductive precoat layer may be formed prior to electrolytic polymerization. Examples of the precursor of the conductive polymer include at least one selected from the group consisting of a monomer, an oligomer, and a prepolymer.

The solid electrolyte layer may be formed by attaching a treatment liquid (for example, a dispersion or a solution) containing a conductive polymer to the dielectric layer, and then drying the treatment liquid. Examples of the dispersion medium (or solvent) include water, an organic solvent, and a mixture thereof.

The treatment liquid may further contain other components (at least one selected from the group consisting of a dopant and an additive agent or the like).

For example, the solid electrolyte layer can be disposed in at least a part of the region of the first groove by performing polymerization in a state where the first groove is brought into contact with the treatment liquid containing the precursor of the conductive polymer or by bringing the treatment liquid containing the conductive polymer into contact with the first groove.

((iv) Step of Forming Cathode Lead-Out Layer)

In this step, the cathode lead-out layer is formed by forming at least the first layer on the solid electrolyte layer. The cathode lead-out layer may be formed by sequentially stacking the first layer and the second layer. The cathode lead-out layer is formed to cover at least a part of the solid electrolyte layer. By doing this, the cathode part including the solid electrolyte layer and the cathode lead-out layer is formed.

The first layer (carbon layer) containing conductive carbon can be formed by, for example, immersing an anode foil having a dielectric layer on which a solid electrolyte layer is formed in a dispersion containing conductive carbon, or applying a paste containing conductive carbon onto a surface of the solid electrolyte layer.

The layer containing metal powder (specifically, the metal paste layer) as the second layer can be formed, for example, by stacking a paste-shaped composition containing metal powder on the surface of the first layer. For example, a composition containing a metal powder such as silver particles and a resin (binder resin) is used as the composition.

In a case where the metal foil is used as the first layer, the metal foil is stacked on the solid electrolyte layer with the separation part interposed between the anode foil and the metal foil as necessary. If necessary, the surface of the metal foil may be roughened by etching treatment or the like. At least one of a coating film containing at least one selected from the group consisting of different type of metal and nonmetal (conductive carbon or the like) and an anodization film may be formed on the surface of the metal foil.

A coating film containing at least one selected from the group consisting of different type of metal and nonmetal (conductive carbon or the like) may be formed as the first layer on the surface of the solid electrolyte layer, and a metal foil may be stacked as the second layer on the surface of the first layer.

((ix) Step of Applying Third Insulating Material)

In this step, a third insulating material is applied to at least a part of a region from a part of the second part at a side close to the cathode part to a part of the cathode part at a side close to the second part. In such a region, as described above, since a stepped part or a recess (neck) is formed by a thickness of the cathode part, at least a part of the neck is covered with the third insulating material in step (ix). Accordingly, it is easy to secure insulation between the anode part and the cathode part, and is also possible to reduce the entry of air from the neck to the inside of the capacitor element. In addition, stress applied to the neck can be alleviated.

The third insulating material is applied to at least a part of the region from the part of the second part at a side close to the cathode part to the part of the cathode part at a side close to the second part in a flowable state. In a case where the third insulating material covering at least a part of this region is a cured product of a curable resin or a composition thereof, the third insulating material is applied to the curable resin or the composition thereof in a flowable state. Meanwhile, a treatment liquid (specifically, a solution or a dispersion (coating agent or the like)) containing the second insulating material and the liquid medium may be applied to at least a part of the region to dry the liquid medium.

The third insulating material can be applied by using, for example, the method described for applying the first insulating material. If necessary, the entire neck and cathode part of the capacitor element obtained in step (iv) may be immersed in third insulating material in a flowable state to cover the surface of the cathode part with the third insulating material. A part of the third insulating material may be impregnated into the cathode lead-out layer, the part of the solid electrolyte layer, the first part of the anode foil, and the like in the neck and the cathode part.

In the first step, step (ix) may be performed after step (iv). Step (ix) is performed before the third step. Step (ix) may be performed before or after the anode lead terminal is connected to the anode part in the second step.

In a case where the curable resin or the composition thereof is used as the third insulating material, the third insulating material may be cured in at least one of this step and the subsequent step as necessary.

(Others)

Note that in a case where multiple capacitor elements are stacked, a stacked body of the capacitor elements may be prepared in the first step (in other words, before the second step) by producing each capacitor element and then stacking the capacitor elements.

(Second Step)

In the second step, the anode lead terminal and the cathode lead terminal are electrically connected to the capacitor element. The lead terminals may be connected after the capacitor element is produced in the first step. While the cathode lead terminal is connected to the capacitor element after the capacitor element is produced, the anode lead terminal may be connected to the anode foil at an appropriate stage in the step of producing the capacitor element.

When a stacked body of multiple capacitor elements is used, the anode lead terminal can be connected to the anode foil in the same manner as described above. The cathode lead terminal may be connected to the capacitor element in the same manner as described above, or one end of the cathode lead terminal may be connected to the stacked body of the plurality of capacitor elements in which the cathode parts are electrically connected to each other.

(Third Step)

In the third step, the capacitor element is sealed with the exterior body by covering the capacitor element and parts of the lead terminals with the exterior body. The sealing can be performed according to the type of the exterior body.

In the case of the resin outer packing, the capacitor element and a part of the anode lead terminal and the cathode lead terminal connected to the capacitor element can be covered with a raw material resin (for example, a curable resin composition, a thermoplastic resin, or a composition thereof) of the resin exterior body, and can be sealed by being molded into a predetermined shape. The resin exterior body can be formed by using a molding technique such as injection molding, insert molding, compression molding, or transfer molding. At this time, a part on the other end side of each lead terminal led out from the capacitor element is sealed in an exposed state.

In a case where a case-shaped exterior body including a container such as a bottomed case and a sealing body is used, a capacitor element is housed in the container, and an opening of the container can be covered and sealed with a sealing body, for example, in a state where the other end of a lead terminal connected to the capacitor element is led out from a through hole formed in the sealing body.

EXAMPLES

Hereinafter, the present disclosure is specifically described with reference to Examples and Comparative Examples, but the present invention is not limited to the following Examples.

<<Solid Electrolytic Capacitor E1>>

Solid electrolytic capacitor E1 including a stacked body in which seven capacitor elements 2 shown in FIG. 6 were stacked was produced in the following manner.

(1) Production of Capacitor Element 2

(a) Formation of Anode Foil

An aluminum foil (thickness of 100 μm) was prepared as a base material, and a surface of the aluminum foil was subjected to an etching treatment to obtain anode foil 6 including porous part 6b. For each of two main surfaces of anode foil 6, first groove g1 was formed by laser processing porous part 6b in a part of the cathode forming part under the following conditions, and a pair of first dense parts d1 adjacent to first groove g1 and provided to sandwich first groove g1 were formed.

(Laser Processing Condition)

Laser processing machine: PicoBlade manufactured by Lumentum Operations LLC
Pulse energy: 6 μJ
Pulse width: 10 psec A percentage of the total of the projected area of the dense part to an effective area of a cathode part, which was obtained by the procedure described above, was 0.1%. Here, the projected area was an area projected to the anode foil in a thickness direction of the anode foil. Thickness T of the porous part was 60 μm, the width (thickness) of the formed first dense part was 5 μm, the depth of the first groove was 1.0 T, and the width of the first groove was 30 μm, all of which were obtained by the procedure described above.

(b) Formation of Dielectric Layer

Anode foil 6 obtained the above (a) was immersed in a phosphoric acid solution (liquid temperature of 70° C.) having a concentration of 0.3 mass %, and a direct-current voltage of 70 V was applied for 20 minutes to form a dielectric layer containing aluminum oxide ($Al_2O_3$) on a surface of anode foil 6.

(c) Formation of Separation Part

The recess was provided by compressing at least a part of the region between anode part iia of anode foil 6 and first part I that is the cathode forming part by press working to provide a recess. Separation part iib was provided by attaching an insulating resist tape (second insulating material) i2 to the recess.

(d) Formation of Solid Electrolyte Layer 9

Anode foil 6 on which the dielectric layer was formed was immersed in a liquid composition containing a conductive material to form a precoat layer.

A polymerization liquid containing pyrrole (monomer of a conductive polymer), naphthalenesulfonic acid (dopant), and water was prepared. Anode foil 6 on which the dielectric layer and the precoat layer were formed was immersed in the obtained polymerization liquid, and electrolytic polymerization was performed at an applied voltage of 3 V to form solid electrolyte layer 9.

(e) Formation of Cathode Lead-Out Layer 10

A dispersion liquid in which graphite particles were dispersed in water was applied to solid electrolyte layer 9 and then dried to form first layer (carbon layer) 11 on the surface of solid electrolyte layer 9. Subsequently, a silver paste containing silver particles and a binder resin (epoxy resin) was applied onto a surface of first layer 11, and then the binder resin was cured by heating to form second layer 12 that is a metal paste layer (silver-paste layer). By doing this, cathode lead-out layer 10 including first layer 11 and second layer 12 was formed. Accordingly, cathode part 8 including solid electrolyte layer 9 and cathode lead-out layer 10 was formed.

(2) Assembly of Solid Electrolytic Capacitor 1

Anode lead terminal 4, cathode lead terminal 5, and adhesive layer 14 were disposed on capacitor element 2 obtained in step (1). Exterior body 3 was formed by sealing a stacked body in which seven such capacitor elements 2 were stacked with a resin, and thus, solid electrolytic capacitor E1 is completed.

<<Solid Electrolytic Capacitor C1>>

An aluminum foil (thickness of 100 μm) was prepared as a base material, and a surface of the aluminum foil was subjected to an etching treatment to obtain anode foil 6 including porous part 6b. Solid electrolytic capacitor C1 was produced in the same manner as in the case of solid electrolytic capacitor E1 except that obtained anode foil 6 was used.

[Evaluation]

For solid electrolytic capacitors E1 and C1 produced above, change rates of electrostatic capacity were evaluated by the following procedure.

Initial electrostatic capacity value C0 (μF) was measured by using an LCR meter for four-terminal measurement in an environment of 20° C. Next, a rated voltage was applied to the solid electrolytic capacitor at a temperature of 145° C. for 1490 hours (heat resistance experiment). The electrostatic capacity (μF) during this period was measured. Temporal changes of the change rates (ΔCap) (%) of the electrostatic capacity were investigated by dividing a value obtained by subtracting an initial value from each value and multiplying the resultant by 100.

Figure 19:
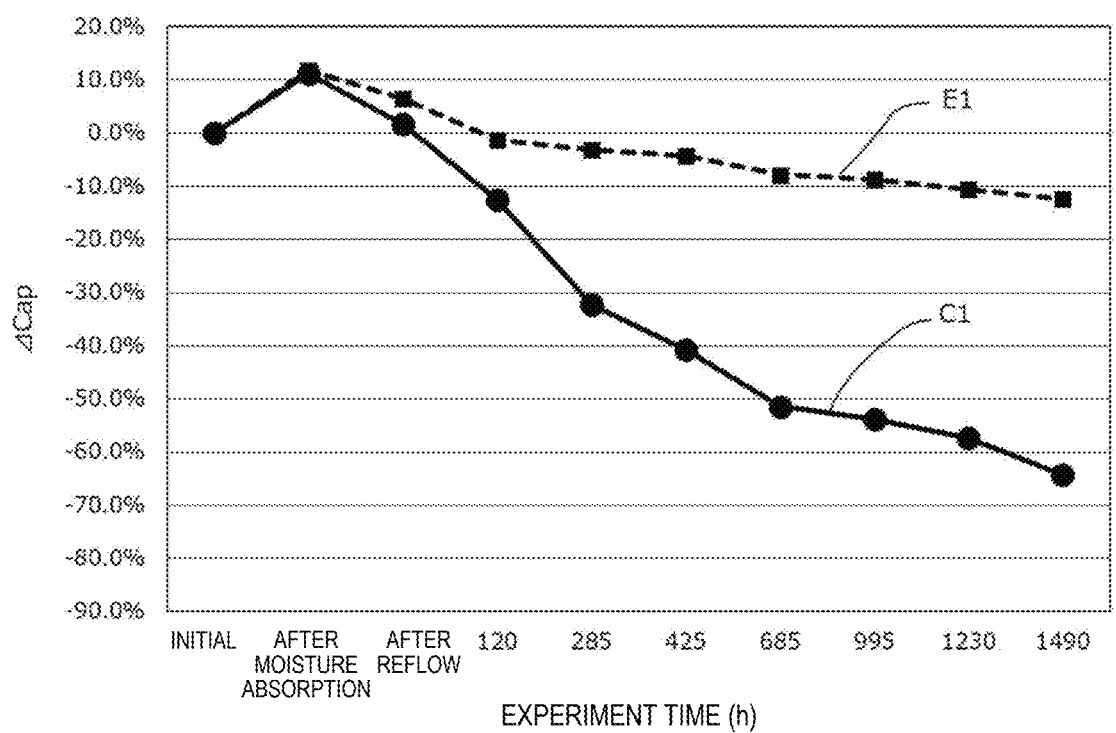
FIG. 19 is a graph showing temporal changes in electrostatic capacity of solid electrolytic capacitors E1 and C1 in a heat resistance experiment.
Figure 20:
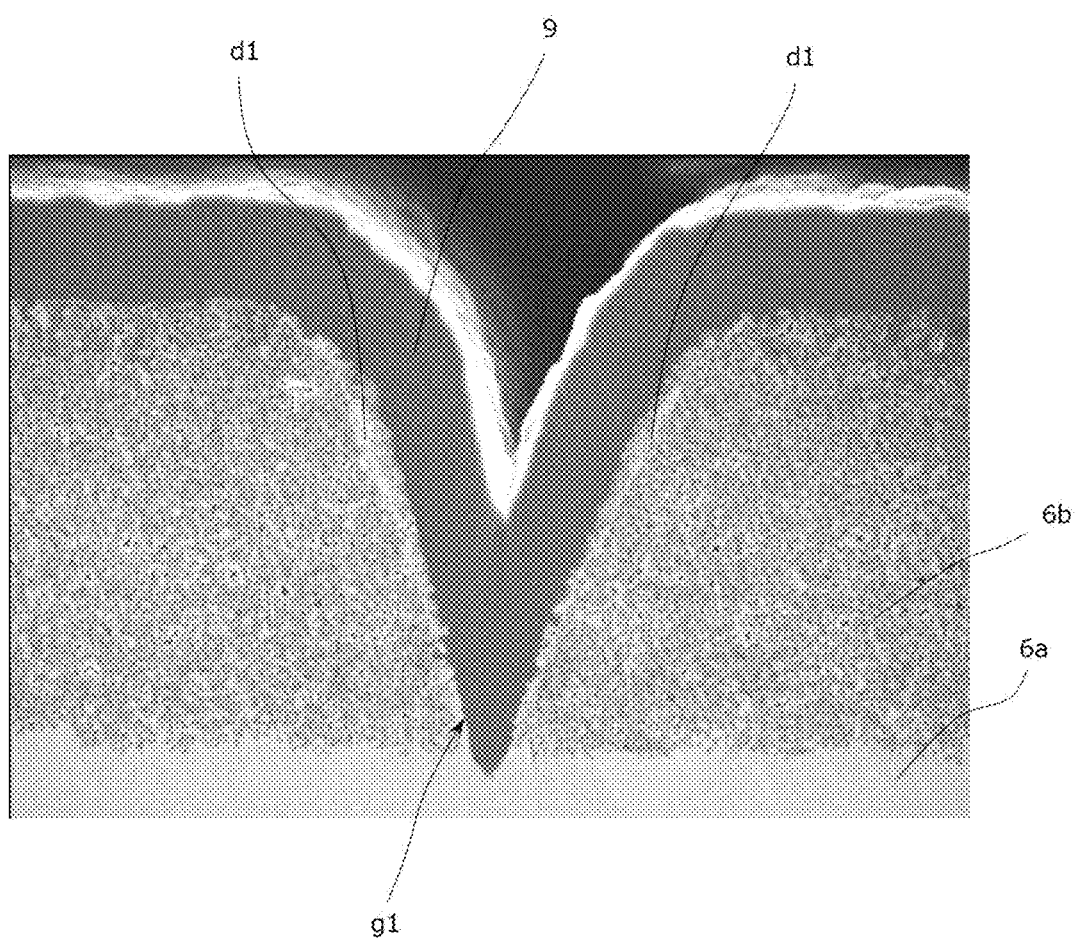
FIG. 20 is a scanning electron microscopic photograph of a dense part and a part around the dense part in a cross section of an anode foil in a state where the solid electrolyte layer used for producing solid electrolytic capacitor E1 is formed.

The results of solid electrolytic capacitors E1 and C1 are shown in FIG. 19. In addition, FIG. 20 shows an SEM image of a cross section in a direction parallel to the longitudinal direction of the anode foil in a state where the solid electrolyte layer obtained in the above (d) is formed in the preparation of solid electrolytic capacitor E1.

As shown in FIG. 19, in solid electrolytic capacitor C1, the electrostatic capacity was less than 50% of the initial electrostatic capacity at a point in time of elapse of 685 hours. In contrast, in solid electrolytic capacitor E1, even after a lapse of 1490 hours, a high electrostatic capacity of 85% or more of the initial electrostatic capacity can be maintained (FIG. 19). In anode foil 6 used for solid electrolytic capacitor E1, as shown in FIG. 20, first dense part d1 and first groove g1 are formed in anode foil 6. Thus, in the solid electrolytic capacitor E1, it is considered that the heat resistance of the solid electrolytic capacitor is improved by reducing the entry of air to the inside of capacitor element 2 by first dense part d1 and first groove g1 and reducing the deterioration of the solid electrolyte layer.

In the solid electrolytic capacitor according to the present disclosure, the deterioration of the solid electrolyte layer is suppressed even in a case where the solid electrolytic capacitor is exposed to a high temperature, and the decrease in electrostatic capacity can be suppressed. In addition, it is also possible to suppress an increase in ESR and an increase in tanδ. Hence, the electrolytic capacitor can be used in various applications such as applications requiring low ESR and high electrostatic capacity of the solid electrolytic capacitor, and applications exposed to heat. These applications are merely examples, and the present disclosure is not limited thereto.

The invention claimed is:

1. A solid electrolytic capacitor element comprising:
an anode foil that includes a porous part in a surface layer of the anode foil;
a dielectric layer that is disposed on at least a part of a surface of the anode foil; and
a cathode part that covers at least a part of the dielectric layer, wherein:
the cathode part includes a solid electrolyte layer and a cathode lead-out layer, the solid electrolyte layer covering the at least a part of the dielectric layer, the cathode lead-out layer covering at least a part of the solid electrolyte layer,
the anode foil includes a first part and a second part, the first part being a cathode forming part where the solid electrolyte layer is formed, the second part being a part where the solid electrolyte layer is not formed,
the surface layer of the anode foil includes a dense part in at least one of the first part or the second part, the dense part having a porosity smaller than a porosity of the porous part,
the second part includes at least an anode part including an end part of the anode foil opposite to the first part,
the dense part is located away from the end part and is adjacent to the porous part in a longitudinal direction of the anode foil,
the dense part includes at least a dense part of the anode part that is positioned in the anode part, and
a groove of the anode part is provided adjacent to the dense part of the anode part.

2. The solid electrolytic capacitor element according to claim 1, wherein the dense part is provided in a region closer to the second part than a center of the first part in the longitudinal direction is.

3. The solid electrolytic capacitor element according to claim 1, wherein a percentage of total of a projected area of the dense part to an effective area of the cathode part is in a range from 0.002% to 20%, inclusive, the projected area being an area projected to the anode foil in a thickness direction of the anode foil.

4. The solid electrolytic capacitor element according to claim 1, wherein at least one dense part is provided in a region from a vicinity of an end of the first part at a side close to the second part to a vicinity of an end of the second part at a side close to the first part.

5. The solid electrolytic capacitor element according to claim 4, wherein:
the second part includes a separation part positioned between the anode part and the first part,
a second insulating material is provided in at least a part of the separation part, and
at least one dense part is provided in a region from a vicinity of the end of the first part at a side close to the second part to a vicinity of an end of the separation part at a side close to the first part.

6. The solid electrolytic capacitor element according to claim 4, further comprising a groove positioned at and near a boundary between the first part and the second part, the groove being adjacent to the dense part.

7. The solid electrolytic capacitor element according to claim 6, wherein at least a part of a region of the groove is covered with a first insulating material.

8. The solid electrolytic capacitor element according to claim 6, wherein the solid electrolyte layer is disposed in at least a part of a region of the groove.

9. The solid electrolytic capacitor element according to claim 1, wherein:
the dense part includes at least a first dense part positioned in the first part, and
a first groove is provided adjacent to the first dense part.

10. The solid electrolytic capacitor element according to claim 9, wherein the first dense part is provided in at least a region adjacent to the first groove at a side close to the second part.

11. The solid electrolytic capacitor element according to claim 9, wherein at least a part of a region of the first groove is covered with a first insulating material.

12. The solid electrolytic capacitor element according to claim 9, wherein the solid electrolyte layer is disposed in at least a part of a region of the first groove.

13. The solid electrolytic capacitor element according to claim 9, wherein:
the second part includes a separation part positioned between the anode part and the first part, and
a second insulating material is provided in at least a part of the separation part.

14. The solid electrolytic capacitor element according to claim 1, wherein the dense part of the anode part is provided in at least a region adjacent to the groove of the anode part at a side close to the first part.

15. The solid electrolytic capacitor element according to claim 1, wherein at least a part of a region of the groove of the anode part is covered with a first insulating material.

16. The solid electrolytic capacitor element according to claim 1, wherein at least a part of a region from a part of the second part positioned at a side close to the cathode part to a part of the cathode part positioned at a side close to the second part is covered with a third insulating material.

17. A solid electrolytic capacitor comprising at least one solid electrolytic capacitor element according to claim 1.

18. A solid electrolytic capacitor element comprising:
an anode foil that includes a porous part in a surface layer of the anode foil;
a dielectric layer that is disposed on at least a part of a surface of the anode foil; and
a cathode part that covers at least a part of the dielectric layer, wherein:
the cathode part includes a solid electrolyte layer and a cathode lead-out layer, the solid electrolyte layer covering the at least a part of the dielectric layer, the cathode lead-out layer covering at least a part of the solid electrolyte layer,
the anode foil includes a first part and a second part, the first part being a cathode forming part where the solid electrolyte layer is formed, the second part being a part where the solid electrolyte layer is not formed,
the surface layer of the anode foil includes a dense part in at least one of the first part or the second part, the dense part having a porosity smaller than a porosity of the porous part,
the second part includes at least an anode part including an end part of the anode foil opposite to the first part,
the dense part is located away from the end part and is adjacent to the porous part in a longitudinal direction of the anode foil,
the second part includes a separation part positioned between the anode part and the first part,
the dense part includes at least a dense part of the separation part that is positioned in the separation part,
a second insulating material disposed on a surface of the separation part is provided, and
the dense part of the separation part is provided in a region of the separation part covered with the second insulating part.

19. The solid electrolytic capacitor element according to claim 18, further comprising a groove of the separation part that is adjacent to the dense part of the separation part.

20. The solid electrolytic capacitor element according to claim 19, wherein at least a part of a region of the groove of the separation part is covered with a first insulating material.

21. A method for producing a solid electrolytic capacitor element comprising:
forming an anode foil that includes a porous part and a dense part having a porosity smaller than a porosity of the porous part by roughening a surface of a metal foil, after disposing a mask on a part of a surface of a metal foil containing a valve metal, to form the porous part in a surface layer of the metal foil and to form the dense part in a region protected by the mask in the surface layer of the metal foil, the anode foil including a first part that is a cathode forming part and a second part including at least an anode part including an end part opposite to the first part;
forming a dielectric layer on at least a part of a surface of the anode foil;
covering at least a part of the dielectric layer in the first part with a solid electrolyte layer; and
covering at least a part of the solid electrolyte layer with a cathode lead-out layer to form a cathode part including the solid electrolyte layer and the cathode lead-out layer, wherein:
the dense part is located away from the end part and is adjacent to the porous part in a longitudinal direction of the anode foil,
the dense part includes at least a dense part of the anode part that is positioned in the anode part, and
a groove of the anode part is provided adjacent to the dense part of the anode part.

22. A method for producing a solid electrolytic capacitor element comprising:
forming an anode foil that includes a porous part by roughening a surface of a metal foil containing a valve metal to form the porous part in a surface layer of the metal foil, the anode foil including a first part that is a cathode forming part and a second part including at least an anode part including an end part opposite to the first part;
forming a dielectric layer on at least a part of a surface of the anode foil;
forming a dense part by melting a part of the surface layer of the anode foil;
covering at least a part of the dielectric layer in the first part with a solid electrolyte layer; and
covering at least a part of the solid electrolyte layer with a cathode lead-out layer to form a cathode part including the solid electrolyte layer and the cathode lead-out layer, wherein:
the dense part is located away from the end part and is adjacent to the porous part in a longitudinal direction of the anode foil,
the dense part includes at least a dense part of the anode part that is positioned in the anode part, and
a groove of the anode part is provided adjacent to the dense part of the anode part.

23. The method for producing a solid electrolytic capacitor element according to claim 22, wherein, in the forming of the dense part, forming a groove in the porous part is performed to form the dense part by melting a region adjacent to the groove.

24. The method for producing a solid electrolytic capacitor element according to claim 23, wherein the forming of the groove and the forming of the dense part are simultaneously performed by irradiation with a laser beam.

* * * * *